(12) United States Patent
Matsumoto

(10) Patent No.: US 12,061,340 B2
(45) Date of Patent: *Aug. 13, 2024

(54) VIRTUAL IMAGE DISPLAY DEVICE AND OPTICAL UNIT

(71) Applicant: SEIKO EPSON CORPORATION, Tokyo (JP)

(72) Inventor: Daiki Matsumoto, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 494 days.

This patent is subject to a terminal disclaimer.

(21) Appl. No.: 17/388,570

(22) Filed: Jul. 29, 2021

(65) Prior Publication Data

US 2022/0035163 A1 Feb. 3, 2022

(30) Foreign Application Priority Data

Jul. 30, 2020 (JP) ................................. 2020-129069

(51) Int. Cl.
  *G02B 27/01* (2006.01)
  *G02B 5/10* (2006.01)
  *G02B 26/08* (2006.01)

(52) U.S. Cl.
  CPC ..... *G02B 27/0172* (2013.01); *G02B 26/0816* (2013.01); *G02B 26/0875* (2013.01); *G02B 2027/0145* (2013.01); *G02B 2027/0178* (2013.01)

(58) Field of Classification Search
  CPC ........ G02B 27/0172; G02B 5/10; G02B 5/08; G02B 27/144; G02B 27/145; G02B 2027/0118; G02B 2027/012; G02B 2027/0178
  See application file for complete search history.

(56) References Cited

U.S. PATENT DOCUMENTS

2020/0018966 A1  1/2020  Komatsu et al.
2020/0050008 A1  2/2020  Seo et al.
2022/0035164 A1* 2/2022  Matsumoto ........ G02B 27/0172

FOREIGN PATENT DOCUMENTS

CN  111290125 A   6/2020
JP  2010-145674 A  7/2010
JP  2020-008749 A  1/2020

OTHER PUBLICATIONS

U.S. Appl. No. 17/389,056, filed Jul. 29, 2021 in the name of Matsumoto.
Apr. 24, 2024 Office Action issued in U.S. Appl. No. 17/389,056.

* cited by examiner

*Primary Examiner* — Ryan D Howard
(74) *Attorney, Agent, or Firm* — Oliff PLC

(57) ABSTRACT

A virtual image display device includes an image light generation device generating image light, a transmissive tilted mirror reflecting the image light from the image light generation device, and a concave transmissive mirror having a concave shape and reflecting, toward the transmissive tilted mirror, the image light reflected by the transmissive tilted mirror to form an exit pupil. The virtual image display device further includes an absorber layer or an absorption film on an external side of a transmissive reflective surface formed in the concave transmissive mirror.

16 Claims, 15 Drawing Sheets

VIRTUAL IMAGE DISPLAY DEVICE AND OPTICAL UNIT

The present application is based on, and claims priority from JP Application Serial Number 2020-129069, filed Jul. 30, 2020, the disclosure of which is hereby incorporated by reference herein in its entirety.

BACKGROUND

1. Technical Field

The present disclosure relates to a see-through type virtual image display device, and particularly to a virtual image display device and an optical unit of a type in which image light is reflected by a transmissive tilted mirror such that the light impinges on a concave transmissive mirror, and the reflection light from the concave transmissive mirror is observed through the transmissive tilted mirror.

2. Related Art

As a virtual image display device including a transmissive reflective surface and a concave mirror, a device including a prism member in which a transmissive reflective surface is incorporated is known, for example (see JP-A-2020-008749). It is disclosed that in this device, image light incident on the prism member is guided by totally reflecting it at a total reflection surface of the prism member toward the transmissive reflective surface, and the image light is reflected at the transmissive reflective surface toward the concave mirror disposed in front of the prism member.

In the virtual image display device disclosed in JP-A-2020-008749, the image light is emitted to the front side, and the image being displayed can be disadvantageously seen from the outside.

SUMMARY

A virtual image display device of an aspect of the present disclosure includes an image light generation device generating image light, a transmissive tilted mirror reflecting the image light from the image light generation device, and a concave transmissive mirror having a concave shape and reflecting, toward the transmissive tilted mirror, the image light reflected by the transmissive tilted mirror to form an exit pupil. The concave transmissive mirror includes a transmissive member, a first reflection member, an absorption member. The transmissive member includes a first surface and a second surface opposing to the first surface. The first reflection member on which the image light reflected by the transmissive tilted mirror is incident, the first reflection member is provided along the first surface of the transmissive member, the first reflection surface reflects a part of the image light and transmits other part of the image light. The absorption member absorbs other part of the image light, the absorption member is provided along the second surface of the transmissive member.

DESCRIPTION OF EXEMPLARY EMBODIMENTS

First Embodiment

With reference to FIGS. 1 to 4 and the like, a virtual image display device according to the present disclosure of the first embodiment and an optical unit incorporated in the virtual image display device are described below.

Figure 1:
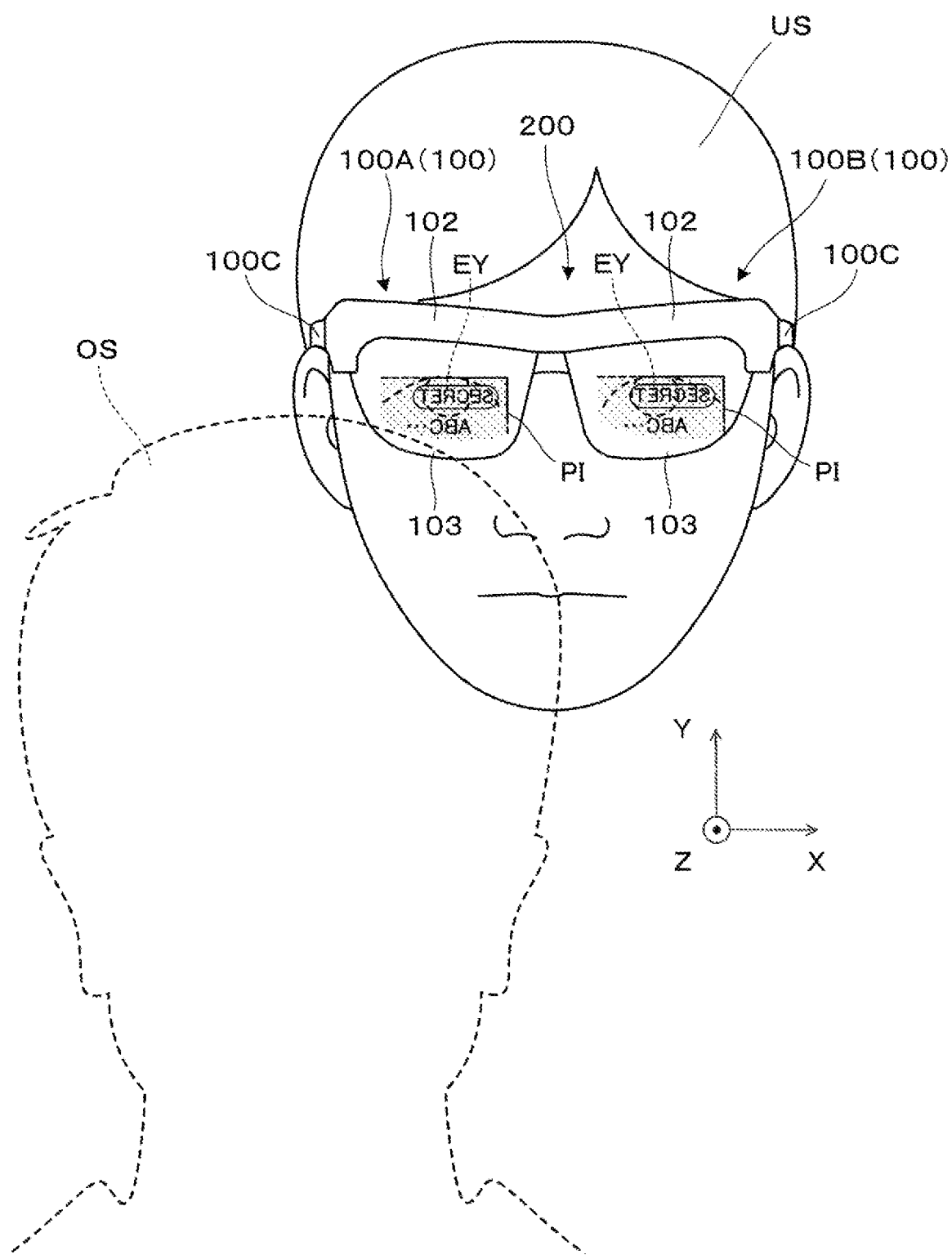
FIG. 1 is an exterior appearance view for describing a mounted state of a virtual image display device of a first embodiment.

FIG. 1 is a drawing for describing a mounted state of a head-mounted display (hereinafter referred to also as an HMD) 200, and with the HMD 200, a viewer or a wearer US wearing it can recognize an image as a virtual image. In FIG. 1 and the like, X, Y, and Z are orthogonal coordinate systems, the +X direction corresponds to the lateral direction in which eyes EY of the viewer or the wearer US wearing the HMD 200 or a virtual image display device 100 are located, the +Y direction corresponds to an upward direction orthogonal to the lateral direction in which the eyes EY are located for the wearer US, and the +Z direction corresponds to a forward direction or a front direction for the wearer US. The ±Y direction is parallel to the vertical axis or the vertical direction.

The HMD 200 includes a right-eye first display device 100A, a left-eye second display device 100B, and a pair of temple-shaped support devices 100C that supports the display devices 100A and 100B. The first display device 100A is composed of a display driving part 102 disposed in the upper part, and an exterior member 103 with an eyeglass-lens shape that covers the front side of the eye. Likewise, the second display device 100B is composed of the display driving part 102 disposed in the upper part and the exterior member 103 with an eyeglass-lens shape that covers the front side of the eye. The support device 100C supports the upper end side of the exterior member 103 through the display driving part 102. The first display device 100A and the second display device 100B are optically reversed left and right, and therefore the right-eye first display device 100A is described as a representative of the virtual image display device 100.

Figure 2:
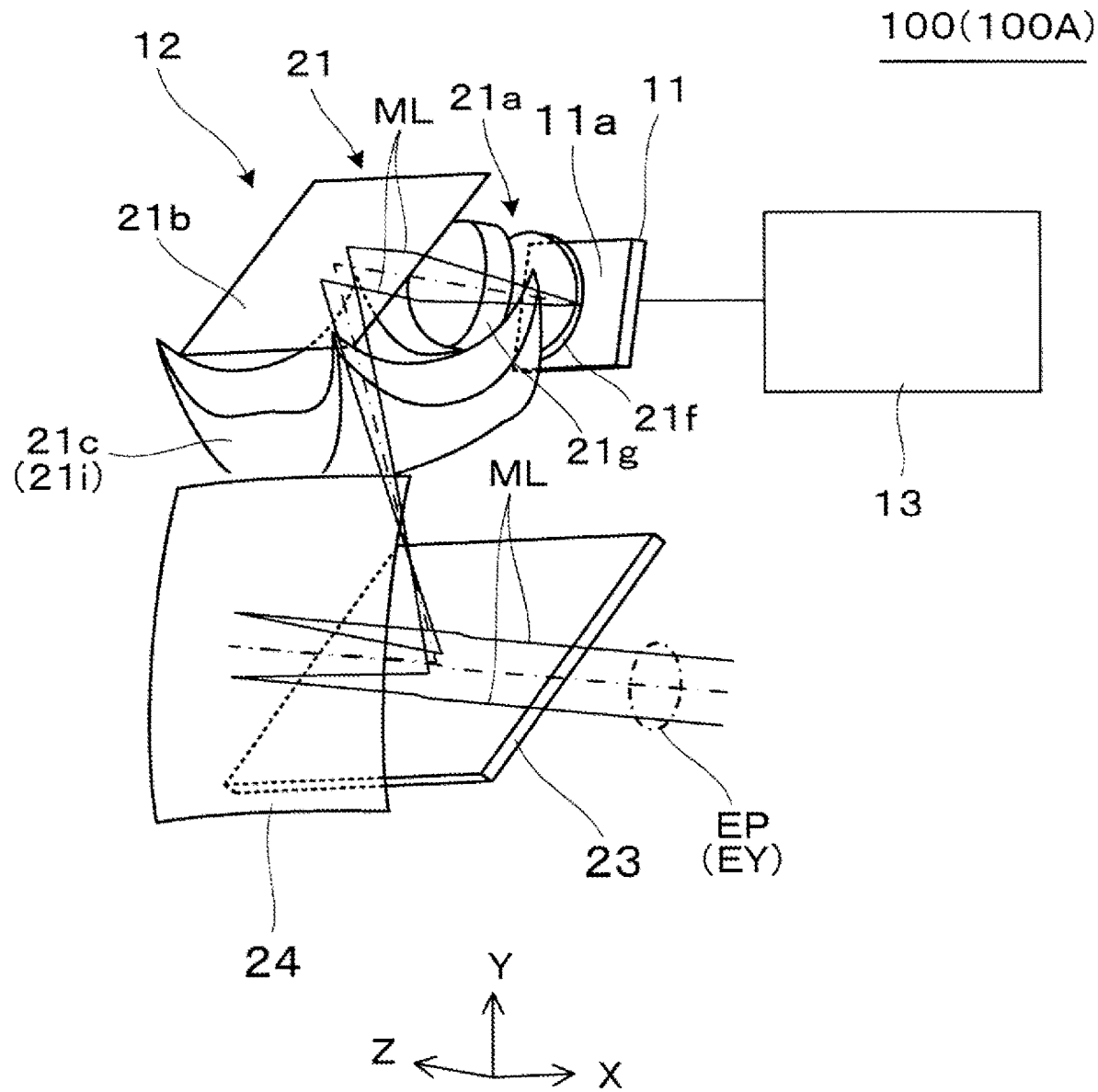
FIG. 2 is a schematic perspective view for describing a structure of the virtual image display device of FIG. 1.
Figure 3:
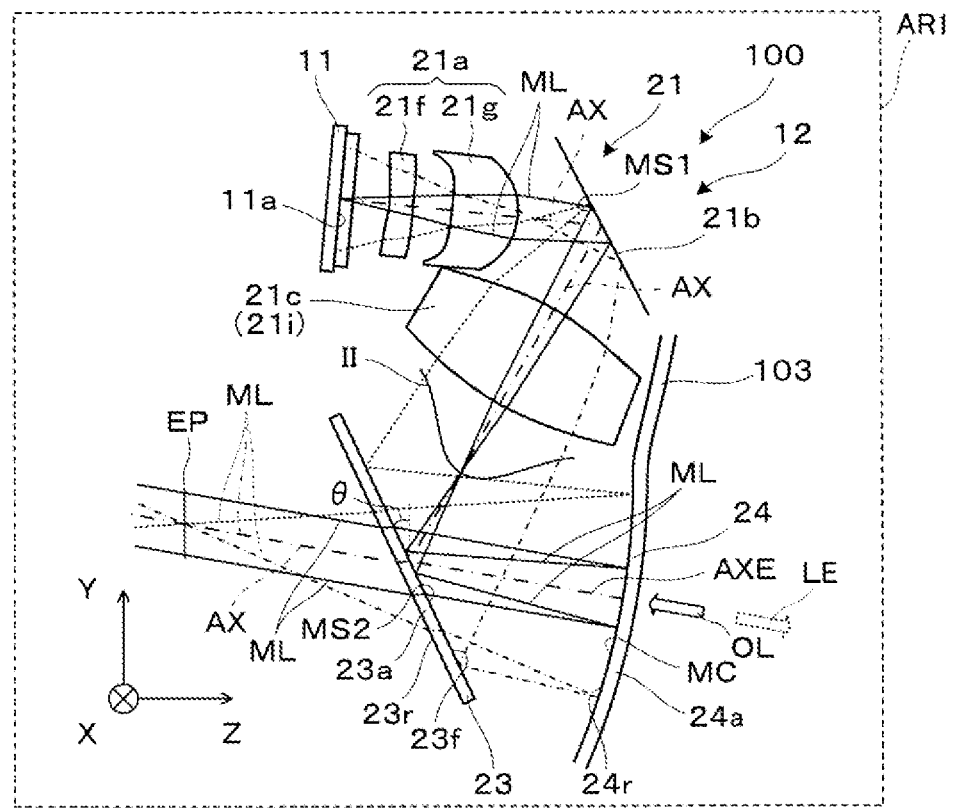
FIG. 3 is a side sectional view and a partial sectional plan view of the virtual image display device of FIG. 1.
Figure 3:
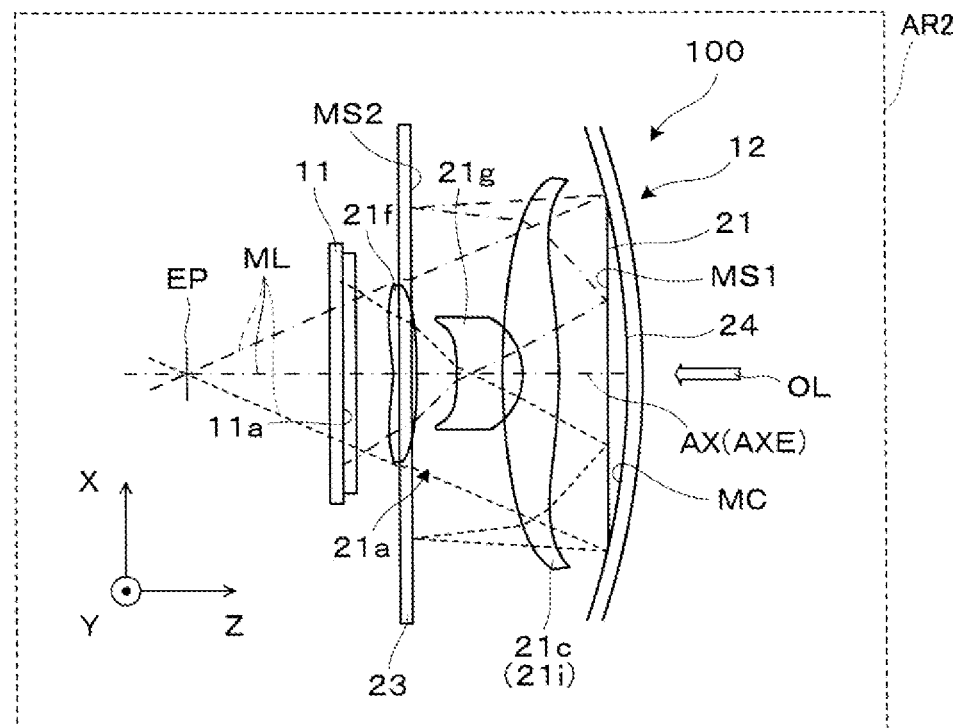

FIG. 2 is a perspective view for describing the virtual image display device 100 serving as the right-eye display device 100A, and FIG. 3 is a drawing for describing an optical structure of the virtual image display device 100. In FIG. 3, a first region AR1 is a side sectional view of an image light generation device 11 and an optical unit 12, and a second region AR2 is a plan view illustrating a partial cross section along light paths of the image light generation device 11 and the optical unit 12.

As illustrated in FIG. 2, the virtual image display device 100 includes the image light generation device 11, the optical unit 12 and a display control circuit 13. It should be noted that, in this specification, one in which the display control circuit 13 is omitted is also referred to as the virtual image display device 100 from the viewpoint of achieving the optical function. The image light generation device 11 and the display control circuit 13 are supported in the outer frame of the display driving part 102 illustrated in FIG. 1, and a part of the optical unit 12 is also supported in the outer frame of the display driving part 102.

The image light generation device 11 is a self-luminous display device, such as, for example, an organic EL (organic electroluminescence, Organic Electro-Luminescence) display, and forms a color still image or a moving image on a two-dimensional display surface 11a. The image light generation device 11 performs a display operation by being driven by the display control circuit 13. The image light generation device 11 is not limited to an organic EL display, and may be replaced by a display device using an inorganic EL, an LED array, an organic LED, a laser array, a quantum dot light emission element and the like. The image light generation device 11 is not limited to a self-luminous image light generation device, and may be a device composed of a light modulation element such as an LCD and configured to form an image by illuminating the light modulation element using a light source such as a backlight. As the image light generation device 11, a liquid crystal on silicon (LCOS (registered trademark)), a digital-micromirror-device and the like may be used in place of an LCD.

As illustrated in FIG. 2 and FIG. 3, the optical unit 12 includes a projection optical system 21, a transmissive tilted mirror 23, and a concave transmissive mirror 24. The term "transmissive mirror" of the concave transmissive mirror 24 means that it is a mirror that partially transmits light. Here, the light path from the image light generation device 11 to the projection optical system 21 is disposed on the upper side of the transmissive tilted mirror 23. To be more specific, the image light generation device 11 and the projection optical system 21 are disposed in a space sandwiched between a tilted plane extended from the transmissive tilted mirror 23 and a vertical plane extended upward from the upper end of the concave transmissive mirror 24.

The projection optical system 21 projects image light ML emitted from the image light generation device 11. The projection optical system 21 converges the image light ML emitted from the image light generation device 11 to form an image, and then injects it into the transmissive tilted mirror 23. That is, the projection optical system 21 is disposed between the image light generation device 11 and the transmissive tilted mirror 23 on the light path. The projection optical system 21 includes a first lens system 21a, a turning mirror 21b and a second lens system 21c. The first lens system 21a includes two lenses, 21f and 21g, in the example illustrated in FIG. 3, but may be composed of one lens or three or more lenses. The second lens system 21c includes one lens 21i in the example illustrated in FIG. 3, but may be two or more lenses. The lenses 21f, 21g and 21i may be spherical lenses, non-spherical lenses, free curved surface lenses, and the like. The turning mirror 21b is a plate-shaped optical member, and includes a flat reflective surface MS1. The flat reflective surface MS1 of the turning mirror 21b is composed of a metal film or a dielectric multilayer film. The flat reflective surface MS1 is obtained by forming a reflective film composed of a single film or a multilayer film made of metal such as Al or Ag or other materials by vapor deposition and the like on a flat plate surface. The turning mirror 21b bends an optical axis AX in a direction of an acute angle smaller than 90° in the YZ plane. The image light ML that travels through the first lens system 21a in the +Z direction, which is the forward direction, is bent by the turning mirror 21b in an oblique and rear downward direction between the −Y direction and the −Z direction, and then the light impinges on the transmissive tilted mirror 23 through the second lens system 21c.

The transmissive tilted mirror 23 is an optical member in a form of a flat plate, and includes a flat reflective surface MS2 having transmissivity. The transmissive tilted mirror 23 is a mirror in which a metal film or a dielectric multilayer film formed as a transmissive reflective film is formed on one surface 23f of a parallel flat plate 23a having a uniform thickness and transmissivity, and the transmissive reflective film functions as the flat reflective surface MS2. The reflectance and transmittance of the flat reflective surface MS2 is set to approximately 50%, for example. It is to be noted that an anti-reflective film is formed on another surface 23r of the parallel flat plate 23a. The transmissive tilted mirror 23 bends the optical axis AX in a substantially orthogonal direction in the YZ plane. The image light ML that travels in a direction slightly tilted rearward with respect to in the −Y direction, which is a downward direction, through the first lens system 21a is bent by the transmissive tilted mirror 23 in a direction slightly tilted rearward with respect to the +Z direction, which is the forward direction, and then the light impinges on the concave transmissive mirror 24. The transmissive tilted mirror 23 is disposed between the concave transmissive mirror 24 and an exit pupil EP where the eye EY or the pupil hole is located, so as to cover the exit pupil EP. The transmissive tilted mirror 23 can be directly or indirectly fixed to the outer frame of the display driving part 102 illustrated in FIG. 1 such that the positional relationship with the concave transmissive mirror 24 and the like can be appropriately set.

With respect to the XY plane extending in the vertical direction as a reference, the transmissive tilted mirror 23 or the flat reflective surface MS2 are tilted by an angle θ=approximately 20 to 40° in the counterclockwise direction around the X axis as viewed from the −X side (see the lateral sectional view of FIG. 3). As described above, the transmissive tilted mirror 23 is disposed such that the angle between the Y axis, which is a vertical axis, and the transmissive tilted mirror 23 is smaller than 45°. When the angle between the Y axis and the transmissive tilted mirror 23 is greater than 45°, the transmissive tilted mirror 23 is tilted than the standard (normal) state, and the thickness in the Z-axis direction increases, whereas when the angle between the Y axis and the transmissive tilted mirror 23 is smaller than 45°, the transmissive tilted mirror 23 is raised than the standard (normal) state, and the thickness of the transmissive mirror in the Z-axis direction is reduced. That is, by setting the angle between the Y axis and the transmissive tilted mirror 23 to an angle smaller than 45° as in the present embodiment, an installation where the transmissive tilted mirror 23 largely protrudes in the −Z direction of the back surface with respect to the concave transmissive mirror 24 as a reference can be avoided, and the increase of the thickness of the virtual image display device 100 or the optical unit 12 in the Z direction in the front-rear direction can be avoided.

The concave transmissive mirror 24 is an optical member having a shape recessed to the exit pupil EP, and includes a transmissive reflective surface MC having transmissivity. The concave transmissive mirror 24 has a light convergence function, collimates the image light ML reflected and scattered at the transmissive tilted mirror 23, and enters the light into the exit pupil EP through the transmissive tilted mirror 23. The concave transmissive mirror 24 includes a surface recessed to the exit pupil EP and a convex surface toward the external side that is obtained by inverting a recessed surface, and thus has a uniform thickness while having a curved shape. A transmissive member 24a of the concave transmissive mirror 24 is a base material that defines the external shape of the concave transmissive mirror 24. The transmissive member 24a has a transmissivity for transmitting light at a predetermined transmittance. On one surface 24r of the transmissive member 24a, a metal film or a dielectric multilayer film is formed as a transmissive reflective film, and such a transmissive reflective film functions as the concave transmissive reflective surface MC. The reflectance of the transmissive reflective surface MC is set to approximately 20 to 50%, for example. The transmissive reflective surface MC is not limited to a spherical surface, and may be an aspherical surface. The image light ML travelling forward after being reflected by the transmissive tilted mirror 23 is reflected back to the transmissive tilted mirror 23 by the concave transmissive mirror 24 such that the light is partially transmitted through the transmissive tilted mirror 23 and collected at the exit pupil EP. An emission light axis AXE from the transmissive tilted mirror 23 toward the concave transmissive mirror 24 coincides with the optical axis AX folded back at the concave transmissive mirror 24 toward the exit pupil EP. The image light ML impinges on the entirety of the transmissive reflective surface MC of the concave transmissive mirror 24 from a substantially perpendicular direction, and has a high optical symmetry. The concave transmissive mirror 24 covers the transmissive tilted mirror 23 on the external side. The transmissive tilted mirror 23 is disposed between the concave transmissive mirror 24 and an exit pupil EP where the eye EY or the pupil hole is located, so as to cover the exit pupil EP. In the optical system illustrated in the drawing, the emission light axis AXE, which is an axis line from the transmissive tilted mirror 23 toward the concave transmissive mirror 24 and is also an axis line from the concave mirror 24 toward the center of the exit pupil EP, extends with a downward tilt of approximately 10° with respect to the +Z direction as the forward direction. With the emission light axis AXE tilted downward on the front side at approximately 10° with respect to the Z axis, which is a horizontal axis, the fatigue of the eye EY of the wearer US observing virtual images can be reduced.

The concave transmissive mirror 24 is incorporated to constitute a part of the transmissive exterior member 103 illustrated in FIG. 1. That is, by providing a transmissive or non-transmissive transmissive member in an extended manner around the concave transmissive mirror 24, the exterior member 103 including the concave transmissive mirror 24 can be achieved. The exterior member 103 is not limited to the eyeglass-lens form, and may have various outlines or exterior appearances.

Regarding the light paths, the image light ML from the image light generation device 11 is focused and bent by the projection optical system 21 to form an image, and then impinges on the transmissive tilted mirror 23. The image light ML that is reflected by, for example, approximately 50% at the transmissive tilted mirror 23 impinges on the concave transmissive mirror 24 so as to be reflected at the transmissive reflective surface MC at a reflectance of approximately 50% or less, for example. The image light ML reflected at the concave transmissive mirror 24 passes through the transmissive tilted mirror 23 and impinges on the exit pupil EP where the eye EY or the pupil hole of the wearer US is located. Here, the exit pupil EP is an eye point of the optical unit 12 where the eye EY is assumed to be disposed, and light from each point of the display surface 11a of the image light generation device 11 impinges in a collected manner in one place at an angle that allows observation of virtual images. Between the transmissive tilted mirror 23 and the projection optical system 21, an intermediate image II is formed. The intermediate image II is an image obtained by appropriately enlarging an image formed on the display surface 11a of the image light generation device 11. External light OL transmitted through the concave transmissive mirror 24 also impinges on the exit pupil EP. That is, the wearer US wearing the HMD 200 can observe a virtual image of the image light ML superimposed on external images.

It is to be noted that while the concave transmissive mirror 24 transmits the external light OL, it also transmits the image light ML, and thus generates leaked light LE on the front side of the concave transmissive mirror 24. If the intensity of the leaked light LE is high, a third party OS existing around the wearer US can observe a part PI of the image displayed on the display surface 11a of the image light generation device 11 (see FIG. 1). In contrast, in the present embodiment, as described later, an absorber layer is provided on the external side of a transmissive reflective film 24b in the concave transmissive mirror 24 to suppress the leaked light LE and avoid the situation where the part PI of the image can be observed by the third party OS.

Figure 4:
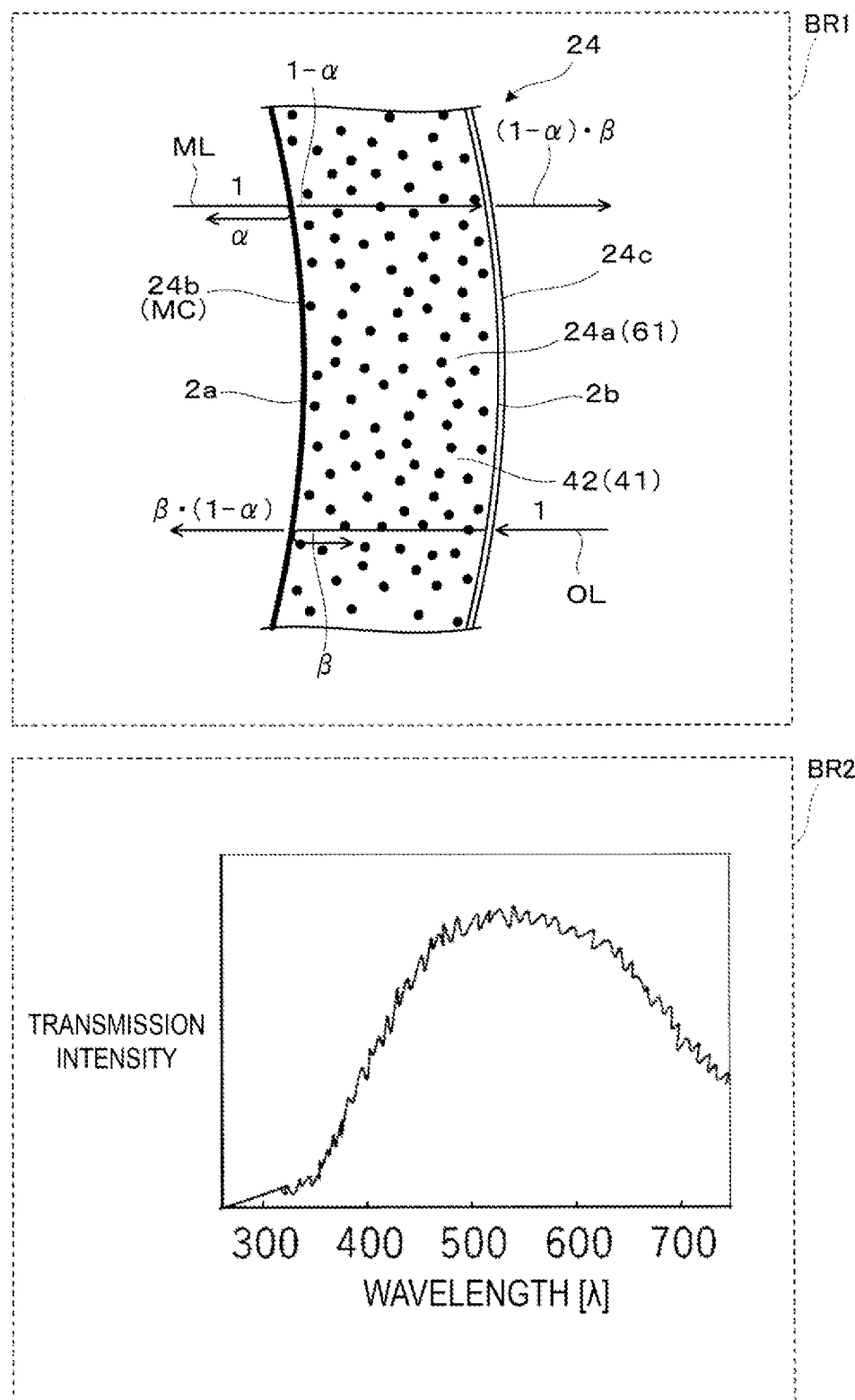
FIG. 4 is an enlarged sectional view illustrating a concave transmissive mirror, and a chart of exemplary transmission characteristics of a transmissive member.

A structure of the concave transmissive mirror 24 is described below with reference to FIG. 4. In FIG. 4, a first region BR1 is an enlarged sectional view illustrating a structure of the concave transmissive mirror 24, and a second region BR2 is a chart of exemplary transmission characteristics of the transmissive member 24a.

The concave transmissive mirror 24 includes the transmissive member 24a that is a supporting body 61 for maintaining the entire shape, the transmissive reflective film 24b formed inside (the exit pupil EP side in FIG. 3) the transmissive member 24a, and an anti-reflective film 24c formed on the external side of the transmissive member 24a.

From the viewpoint of ensuring the strength of the shape, the concave transmissive mirror 24 or the transmissive member 24a has a thickness of 1 mm or greater, but preferably has a thickness of 2 mm or smaller from the viewpoint of weight reduction. The transmissive member 24a is formed by injection molding using an optically transparent resin material, for example. The transmissive member 24a is an emission light absorption member 42, and functions as the absorber layer 41 that suppresses emission, to the external side, of emission light passed through the transmissive reflective film 24b. With the transmissive member 24a i.e., the emission light absorption member 42, desired light reduction, such as reduction of the transmittance to ½, can be achieved. The emission light absorption member 42 is composed of a material in which an absorber is dispersed in a base material of a resin, or more specifically, the emission light absorption member 42 is formed by including nano particles having a size of approximately 10 to 100 nm made of metal or the like in the resin. Here, when nano particles dispersed in the emission light absorption member 42 absorbs light with a good balance among three colors of RGB, the light reduction can be achieved while maintaining the color tone of the transmitted light. The transmittance of the emission light absorption member 42 can be adjusted by adjusting the density of the nano particles in the emission light absorption member 42 and the like. The second region BR2 of FIG. 4 illustrates an exemplary transmission intensity of a case where metal nano particles are dispersed in the emission light absorption member 42. In this case, it can be seen that substantially the same transmittance distribution can be achieved in a wavelength range from 450 nm to 650 nm. Although not illustrated in the drawing, the reflectance of the emission light absorption member 42 can be set to a constant value of substantially zero % regardless of the wavelength. The metal nano particles are not limited to a single metal, and may be also be an alloy or the like. The emission light absorption member 42 is not limited to one in which nano particles are dispersed in a base material of a resin, and one in which inorganic pigment and/or organic pigment is mixed in a resin may be used. In this case, color mixing can be achieved by selecting and blending the pigments. Further, resins with carbon fiber kneaded into them can also be used. In the above-mentioned configuration, for the base material of the emission light absorption member 42, an acrylic resin, a polycarbonate resin and the like may be used.

The transmissive reflective film 24b functions as the transmissive reflective surface MC, and reflects the image light ML at a desired reflectance. The transmissive reflective film 24b has a structure in which a metal film is covered with a protective film, and can be formed by depositing metal or metal oxide of aluminum, silver and the like on a first surface 2a of the transmissive member 24a on the exit pupil EP side. At this time, the reflectance of the transmissive reflective film 24b can be adjusted through adjustment of the thickness of the metal film the like. The transmissive reflective film 24b is not limited to the metal film, and may be formed of a dielectric multilayer film. To be more specific, several types of metal oxide films are stacked in the film thickness based on the optical design, on the first surface 2a of the transmissive member 24a. In this manner, the reflectance of the transmissive reflective film 24b can be substantially equalized in the wavelength range of each color included in the image light ML, and thus the transmissive reflective film 24b can reflect the image light ML at a desired reflectance over the entire wavelength range. It is to be noted that it is not necessary to form the transmissive reflective film 24b directly on the transmissive member 24a. For example, the transmissive member 24a may be covered with a hard coat film and the transmissive reflective film 24b may be formed on top of that.

The anti-reflective film 24c prevents the image light ML passed through the transmissive reflective film 24b from traveling backward and forming ghosts. The anti-reflective film 24c is a dielectric multilayer film. The anti-reflective film 24c is formed by stacking several types of metal oxide films in the film thickness based on the optical design, on a second surface 2b of the transmissive member 24a. It is to be noted that it is not necessary to form the anti-reflective film 24c directly on the transmissive member 24a. For example, the transmissive member 24a may be covered with a hard coat film and the anti-reflective film 24c may be formed on top of that.

Assuming the reflectance of the transmissive reflective film 24b is α and the transmittance of the transmissive member 24a is β, the image light ML is attenuated to (1−α) from the original state via the transmissive reflective film 24b, and attenuated to (1−α)·β from the original state by being passed through the emission light absorption member 42. In the case where the reflectance α and the transmittance β are ½, for example, the intensity of the image light ML emitted to the external side of the concave transmissive mirror 24 is attenuated to ¼. It is to be noted that the external light OL is attenuated to β·(1−α) by the concave transmissive mirror 24. In the case where the reflectance α and the transmittance β are ½, for example, the intensity of the external light OL that reaches the transmissive tilted mirror 23 through the concave transmissive mirror 24 is attenuated to ¼. From the above, with the concave transmissive mirror 24 used in the present embodiment, it is easier to prevent other persons from observing the image light ML while ensuring the see-through property, and the privacy can be improved. It is to be noted that the transmittance β, of the transmissive member 24a is set to approximately 30% to 60%, for example.

Figure 5:
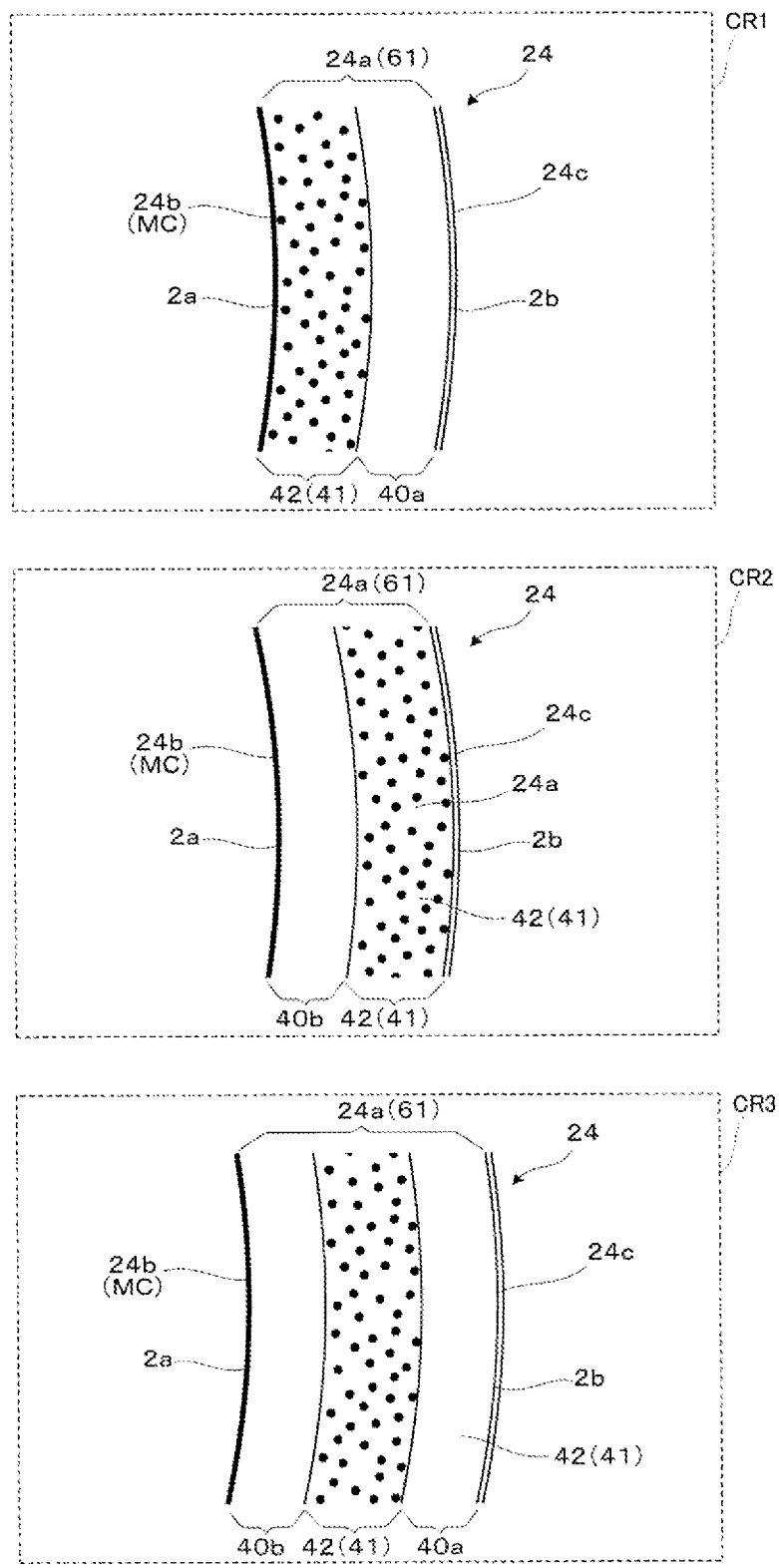
FIG. 5 is an enlarged sectional view illustrating a concave transmissive mirror of a modification.

With reference to FIG. 5, first to third modifications of the concave transmissive mirror 24 illustrated in FIG. 4 are described below. In FIG. 5, a first region CR1 is an enlarged sectional view illustrating the first modification, a second region CR2 is an enlarged sectional view illustrating the second modification, and a third region CR3 is an enlarged sectional view illustrating the third modification.

In the first modification illustrated in the first region CR1 of FIG. 5, the transmissive member 24a has a two-layer structure composed of the emission light absorption member 42 and a light transmitting member 40a, and the emission light absorption member 42 is disposed on the inner side, i.e., the transmissive reflective film 24b side. As in the first region BR1 illustrated in FIG. 4, the emission light absorption member 42 is formed by dispersing metal nano particles in a resin, for example. The light transmitting member 40a is formed of an optically transparent resin, such as an acrylic resin and a polycarbonate resin. The emission light absorption member 42 and the light transmitting member 40a may be joined to each other after being independently formed, or may also be formed by conjection molding.

In the second modification illustrated in the second region CR2, the transmissive member 24a has a two-layer structure composed of a light transmitting member 40b and the emission light absorption member 42, and the emission light absorption member 42 is disposed on the external side, i.e., the anti-reflective film 24c side. That is, the emission light absorption member 42 is formed on the side opposite to the transmissive reflective surface MC through the light transmitting member 40b that constitutes the supporting body 61 that supports the transmissive reflective surface MC. As in the first region BR1 illustrated in FIG. 4, the emission light absorption member 42 is formed by dispersing metal nano particles in a resin, for example. As in the first modification illustrated in the first region CR1, the light transmitting member 40b is formed of an optically transparent resin. The emission light absorption member 42 and the light transmitting member 40b may be joined to each other after being independently formed, or may also be formed by conjection molding.

In the third modification illustrated in the third region CR3, the transmissive member 24a has a three-layer structure composed of a pair of light transmitting members 40a and 40b and the emission light absorption member 42, and the emission light absorption member 42 is disposed between the pair of light transmitting members 40a and 40b. The emission light absorption member 42 is formed by dispersing metal nano particles in a resin, for example. The light transmitting members 40a and 40b are formed of an optically transparent resin.

Figure 6:
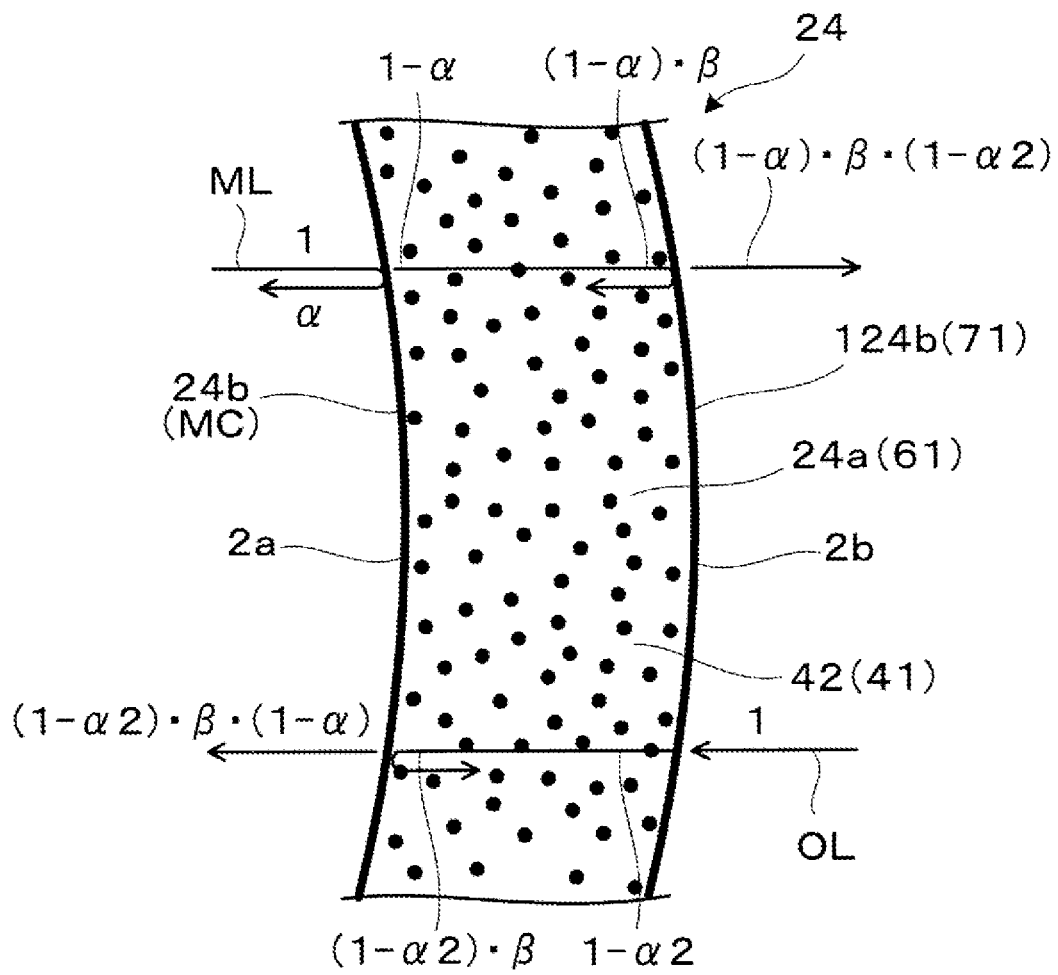
FIG. 6 is an enlarged sectional view illustrating a concave transmissive mirror of a modification.

With reference to FIG. 6, a fourth modification the concave transmissive mirror 24 illustrated in FIG. 4 is described below. In this case, the concave transmissive mirror 24 includes the transmissive member 24a that is the supporting body 61, a first the transmissive reflective film 24b formed inside the transmissive member 24a, and a second transmissive reflective film 124b formed on the external side of the transmissive member 24a. The second transmissive reflective film 124b is an outer reflective surface 71. That is, the emission light absorption member 42 is disposed between the first transmissive reflective surface 24b and the second transmissive reflective film 124b (i.e., the outer reflective surface 71). As in the first region BR1 illustrated in FIG. 4, the pair of the transmissive reflective films 24b and 124b has a structure in which a metal film is covered with a protective film. In this case, assuming the reflectance of the transmissive reflective film 24b is $\alpha$, the transmittance of the transmissive member 24a is $\beta$ and the reflectance of the transmissive reflective film 124b is $\alpha 2$, the image light ML is transmitted through the concave transmissive mirror 24 and attenuated to $(1-\alpha) \cdot \beta \cdot (1-\alpha 2)$ from the original state. In the case where the reflectances $\alpha$ and $\alpha 2$ and the transmittance $\beta$ are ½, for example, the intensity of the image light ML emitted to the external side of the concave transmissive mirror 24 is attenuated to ⅛. It is to be noted that the external light OL is attenuated to $(1-\alpha 2) \cdot \beta \cdot (1-\alpha)$ by the concave transmissive mirror 24. In the case where the reflectances $\alpha$ and $\alpha 2$ and the transmittance $\beta$ are ½, for example, the intensity of the external light OL that reaches the transmissive tilted mirror 23 through the concave transmissive mirror 24 is attenuated to ⅛.

It is to be noted that an anti-reflective film may be provided on the external side of the transmissive reflective film 124b. In the case where the transmissive reflective film 124b is a metal film, the anti-reflective film serves as a protective film. For the transmissive reflective film 124b, an organic material may be used.

Since the virtual image display device 100 of the first embodiment described above includes the absorber layer 41 on the external side of the transmissive reflective surface MC formed in the concave transmissive mirror 24, the image light transmitted through the transmissive reflective surface MC and emitted to the external side is reduced by the absorber layer 41, the image being displayed is less seen from the outside, and the effect of suppressing information leakage is increased. It is to be noted that through the use of the transmissive tilted mirror 23, the weight of the optical system of the virtual image display device can be reduced in comparison with a case where a prism member is used.

Second Embodiment

A virtual image display device of a second embodiment is described below. The virtual image display device and the like of the second embodiment are obtained by partially changing the virtual image display device of the first embodiment, and therefore the description for the common portions is omitted.

Figure 7:
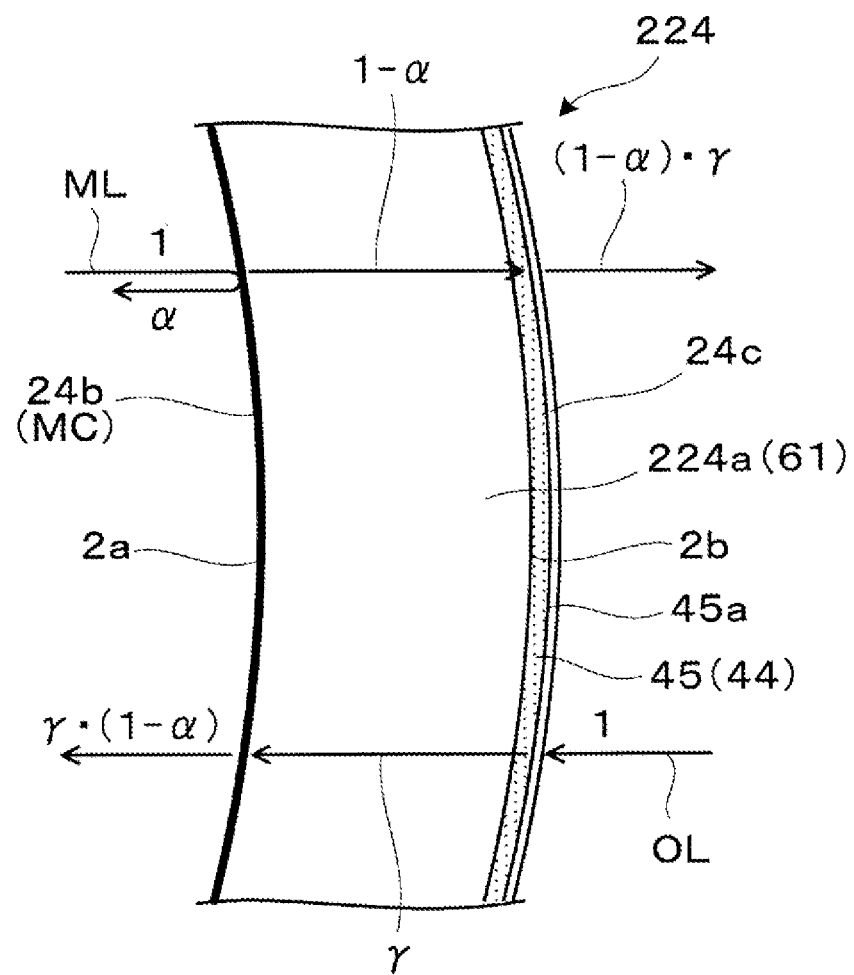
FIG. 7 is an enlarged sectional view illustrating a concave transmissive mirror of a second embodiment.

With reference to FIG. 7, a concave transmissive mirror 224 incorporated in the virtual image display device of the second embodiment is described below. In this case, the concave transmissive mirror 224 includes a transmissive member 224a that is the supporting body 61, the transmissive reflective film 24b formed inside the transmissive member 224a, an emission light absorption film 45 formed on the external side of the transmissive member 224a, and the anti-reflective film 24c formed on the external side of the emission light absorption film 45.

The transmissive member 224a is formed of an optically transparent resin, such as an acrylic resin and a polycarbonate resin, and transmits the image light ML without attenuating the image light ML.

The emission light absorption film 45 functions as an absorption film 44 that suppresses emission, to the external side, of the emission light passed through the transmissive reflective film 24b. The transmissive reflective film 24b and the absorption film 44 are formed such that they are spaced apart from each other. With the emission light absorption film 45, desired light reduction, such as reduction of the transmittance to ½, can be achieved. The emission light absorption film 45 can be formed by forming a metal thin film on the external side surface of the resin that constitutes the transmissive member 224a, i.e., on the second surface 2b, for example. The metal thin film is formed as a multi-layer film by vapor deposition, sputtering and the like using materials such as metals such as Ag, Cr and Al and dielectric materials, for example. The emission light absorption film 45 may be formed by dipping the external side surface of the resin that constitutes the transmissive member 224a into a dye, for example. By dipping it into several types of dye, the light reduction can be achieved while maintaining the color tone of the transmitted light. Further, the emission light absorption film 45 may be formed by coating it with an organic material colored in grey, and may also be formed by pasting films of polyester or other resins colored in grey.

It is to be noted that the anti-reflective film 24c is formed on the external side surface 45a of the emission light absorption film 45. The anti-reflective film 24c may be formed on the emission light absorption film 45 covered with a hard coat film.

Assuming the reflectance of the transmissive reflective film 24b is $\alpha$ and the transmittance of the emission light absorption film 45 is $\gamma$, the image light ML is attenuated to $(1-\alpha)$ from the original state via the transmissive reflective film 24b and attenuated to $(1-\alpha) \cdot \gamma$ from the original state by being passed through the emission light absorption film 45. In the case where the reflectance $\alpha$ and the transmittance $\gamma$ are ½, for example, the intensity of the image light ML emitted to the external side of the concave transmissive mirror 24 is attenuated to ¼. It is to be noted that the external light OL is attenuated to $\gamma \cdot (1-\alpha)$ by the concave transmissive mirror 24. In the case where the reflectance $\alpha$ and the transmittance $\gamma$ are ½, for example, the intensity of the external light OL that reaches the transmissive tilted mirror 23 through the concave transmissive mirror 24 is attenuated to ¼. From the above, with the concave transmissive mirror 24 used in the present embodiment, the privacy can be improved while ensuring the see-through property.

Although not illustrated in the drawing, the emission light absorption film 45 can be formed so as to be embedded inside the transmissive member 224a, or may be formed between the transmissive reflective film 24b and the transmissive member 224a.

Since the virtual image display device 100 of the second embodiment described above includes the absorption film 45 on the external side of the transmissive reflective surface MC formed in the concave transmissive mirror 24, the image light ML transmitted through the transmissive reflective surface MC and emitted to the external side is reduced by the absorption film 45, the image being displayed is less seen from the outside, and the effect of suppressing information leakage is increased.

Third Embodiment

A virtual image display device of a third embodiment is described below. The virtual image display device and the like of the third embodiment are obtained by partially changing the virtual image display device of the first embodiment, and therefore the description for the common portions is omitted.

Figure 8:
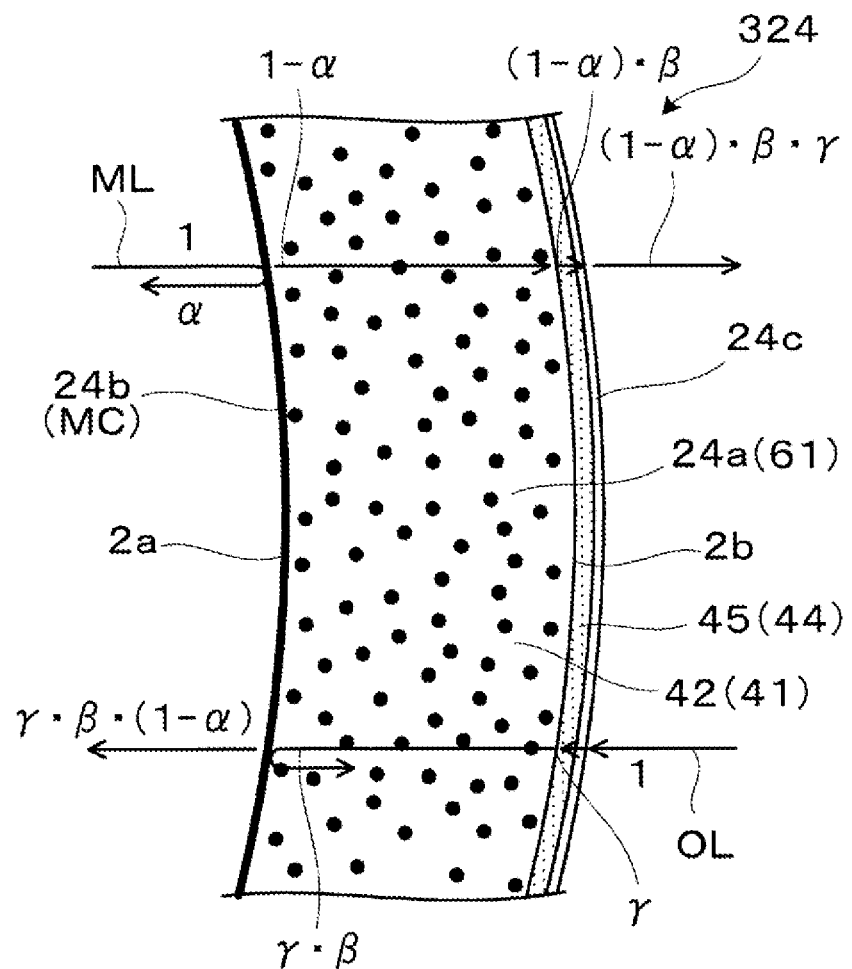
FIG. 8 is an enlarged sectional view illustrating a concave transmissive mirror of a third embodiment.

With reference to FIG. 8, a concave transmissive mirror 324 incorporated in the virtual image display device of the third embodiment is described below. In this case, the concave transmissive mirror 324 includes the transmissive member 24a that is the supporting body 61, the transmissive reflective film 24b formed inside the transmissive member 24a, the emission light absorption film 45 formed on the external side of the transmissive member 24a, and the anti-reflective film 24c formed on the external side of the emission light absorption film 45.

The transmissive member 24a is an emission light absorption member 42, and functions as the absorber layer 41 that suppresses emission, to the external side, of emission light passed through the transmissive reflective film 24b. The emission light absorption film 45 functions as an absorption film 44 that suppresses emission, to the external side, of the emission light passed through the transmissive reflective film 24b. With the emission light absorption member 42, desired light reduction, such as reduction of the transmittance to ½, can be achieved. Also, with the emission light absorption film 45, desired light reduction, such as further reduction of the transmittance to ½, can be achieved.

Assuming the reflectance of the transmissive reflective film 24b is $\alpha$, the transmittance of the emission light absorption member 42 is $\beta$, and the transmittance of the emission light absorption film 45 is $\gamma$, the image light ML is attenuated to $(1-\alpha)$ from the original state via the transmissive reflective film 24b, attenuated to $(1-\alpha)\cdot\beta$ from the original state by being passed through the emission light absorption member 42, and attenuated to $(1-\alpha)\cdot\beta\cdot\gamma$ from the original state by being passed through the emission light absorption film 45. In the case where the reflectance a and the transmittances $\beta$ and $\gamma$ are ½, for example, the intensity of the image light ML emitted to the external side of the concave transmissive mirror 24 is attenuated to ⅛. It is to be noted that the external light OL by the concave transmissive mirror 24 is attenuated to $\gamma\cdot\beta(1-\alpha)$. In the case where the reflectance $\alpha$ and the transmittances $\beta$ and $\gamma$ are ½, for example, the intensity of the external light OL that reaches the transmissive tilted mirror 23 through the concave transmissive mirror 24 is attenuated to ⅛. From the above, with the concave transmissive mirror 24 used in the present embodiment, the privacy can be improved while ensuring the see-through property.

Although not illustrated in the drawing, the emission light absorption film 45 may be formed so as to be embedded inside the transmissive member 24a, or may be formed between the transmissive reflective film 24b and the transmissive member 24a.

Fourth Embodiment

A virtual image display device of a fourth embodiment is described below. The virtual image display device and the like of the fourth embodiment are obtained by partially changing the virtual image display device of the first embodiment, and therefore the description for the common portions is omitted.

Figure 9:
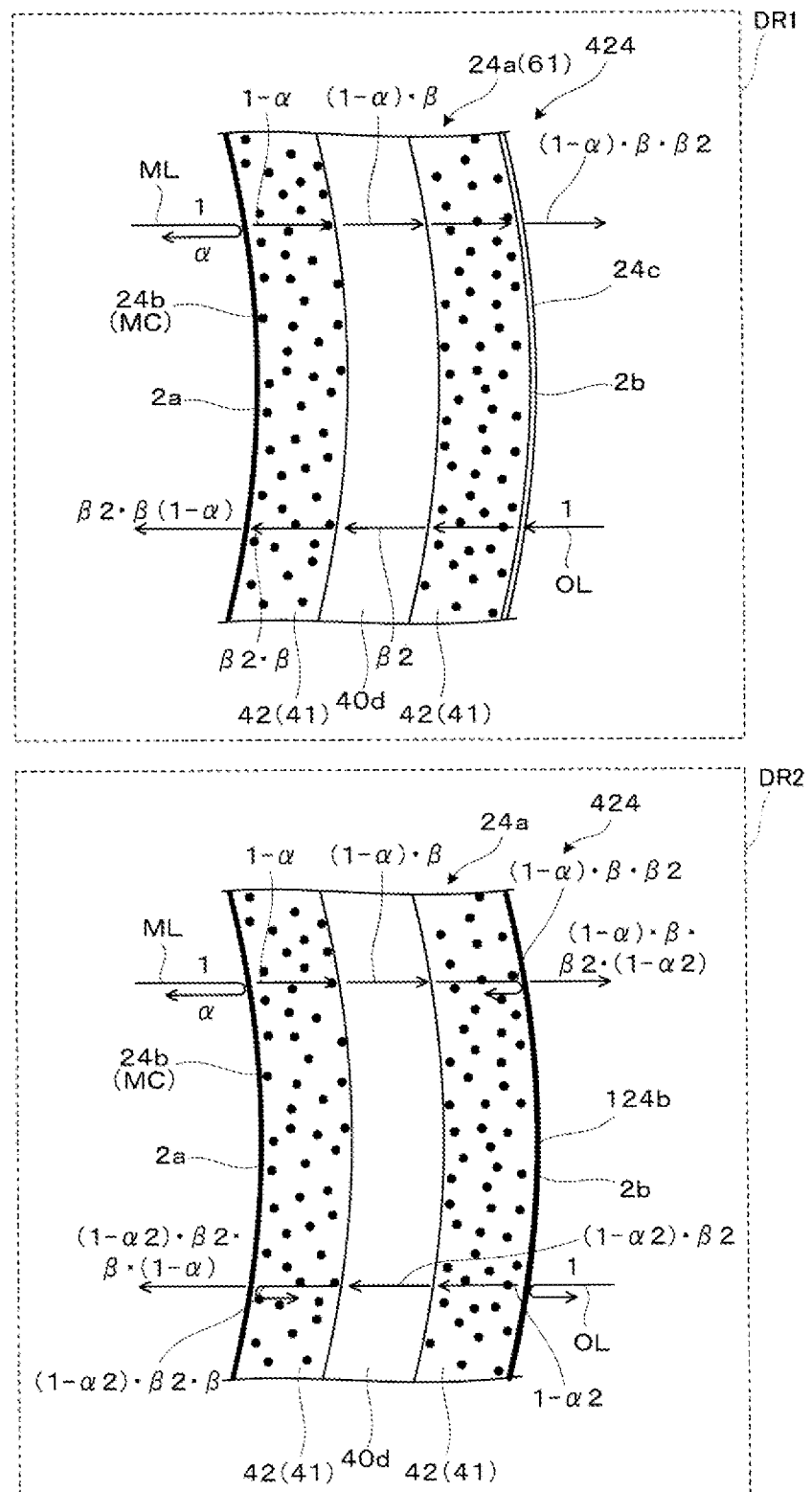
FIG. 9 is an enlarged sectional view illustrating a concave transmissive mirror of a fourth embodiment.

With reference to FIG. 9, a concave transmissive mirror 424 incorporated in the virtual image display device of the fourth embodiment is described below. In FIG. 9, a first region DR1 is an enlarged sectional view illustrating a structure of the concave transmissive mirror 424, and a second region DR2 is an enlarged sectional view illustrating a structure of the concave transmissive mirror 424 of a modification.

The concave transmissive mirror 424 illustrated in the first region DR1 of FIG. 9 includes the transmissive member 24a that is the supporting body 61, the transmissive reflective film 24b formed inside the transmissive member 24a, and the anti-reflective film 24c formed on the external side of the transmissive member 24a.

The transmissive member 24a has a three-layer structure composed of a light transmitting member 40d, a first emission light absorption member 42 disposed inside the light transmitting member 40d, and a second emission light absorption member 42 disposed on the external side of the light transmitting member 40d. Here, the thickness and the distance of the pair of the emission light absorption members 42 is substantially equal to or greater than a film, i.e., 100 µm or greater, which causes no interference problem. The light transmitting member 40d is formed of an optically transparent resin, such as an acrylic resin and a polycarbonate resin. As in the case of the first embodiment illustrated in FIG. 4, the pair of the emission light absorption members 42 is formed by dispersing metal nano particles in a resin, for example. The light transmitting member 40d and the pair of the emission light absorption members 42 may be joined to each other after being independently formed, or may be formed by multicolor molding.

Assuming the reflectance of the transmissive reflective film 24b is $\alpha$, the transmittance of the first emission light absorption member 42 is $\beta$, and the transmittance of the second emission light absorption member 42 is $\beta 2$, the image light ML is attenuated to $(1-\alpha)$ from the original state via the transmissive reflective film 24b, attenuated to $(1-\alpha)\cdot\beta$ from the original state by being passed through the first emission light absorption member 42, and attenuated to $(1-\alpha)\cdot\beta\cdot\beta 2$ from the original state by being passed through the second emission light absorption member 42. In the case where the reflectance $\alpha$ and the transmittances $\beta$ and $\beta 2$ are ½, for example, the intensity of the image light ML emitted to the external side of the concave transmissive mirror 24 is attenuated to ⅛. It is to be noted that the external light OL is attenuated to $\beta 2\cdot\beta\cdot(1-\alpha)$ by the concave transmissive mirror 24. In the case where the reflectance $\alpha$ and the transmittances $\beta$ and $\beta 2$ are ½, for example, the intensity of the external light OL that reaches the transmissive tilted mirror 23 through the concave transmissive mirror 24 is attenuated to ⅛. From the above, with the concave transmissive mirror 24 used in the present embodiment, the privacy can be improved while ensuring the see-through property.

Although not illustrated in the drawing, the pair of the emission light absorption members 42 may be formed so as to be embedded inside the transmissive member 24a. Further, three or more emission light absorption members 42 may be formed so as to be embedded inside the transmissive member 24a.

The concave transmissive mirror 424 of a modification illustrated in the second region DR2 of FIG. 9 includes the transmissive member 24a that is the supporting body 61, the transmissive member 24a formed inside the first the transmissive reflective film 24b, and the transmissive member 24a formed on the external side of the second transmissive reflective film 124b. The transmissive member 24a has a three-layer structure composed of the light transmitting member 40d, the first emission light absorption member 42, and the second emission light absorption member 42. As in the first region BR1 illustrated in FIG. 4, the pair of the transmissive reflective films 24b and 124b has a structure in which a metal film is covered with a protective film. In this case, assuming the reflectance of the first transmissive reflective film 24b is α, the transmittance of the first emission light absorption member 42 is β, the transmittance of the second emission light absorption member 42 is β2, and the second the reflectance of the transmissive reflective film 124b is α2, the image light ML is attenuated to $(1-\alpha)\cdot\beta\cdot\beta2\cdot(1-\alpha2)$ from the original state by being passed through the concave transmissive mirror 24. In the case where the reflectances α and α2 and the transmittances β and β2 are ½, for example, the intensity of the image light ML emitted to the external side of the concave transmissive mirror 24 is attenuated to 1/16. It is to be noted that the external light OL is attenuated to $(1-\alpha2)\cdot\beta\cdot\beta2\cdot(1-\alpha)$ by the concave transmissive mirror 24. In the case where the reflectances α and α2 and the transmittances β, and β2 are ½, for example, the intensity of the external light OL that reaches the transmissive tilted mirror 23 through the concave transmissive mirror 24 is attenuated to 1/16.

Fifth Embodiment

A virtual image display device of a fifth embodiment is described below. The virtual image display device and the like of the fifth embodiment are obtained by partially changing the virtual image display device of the first embodiment, and therefore the description for the common portions is omitted.

Figure 10:
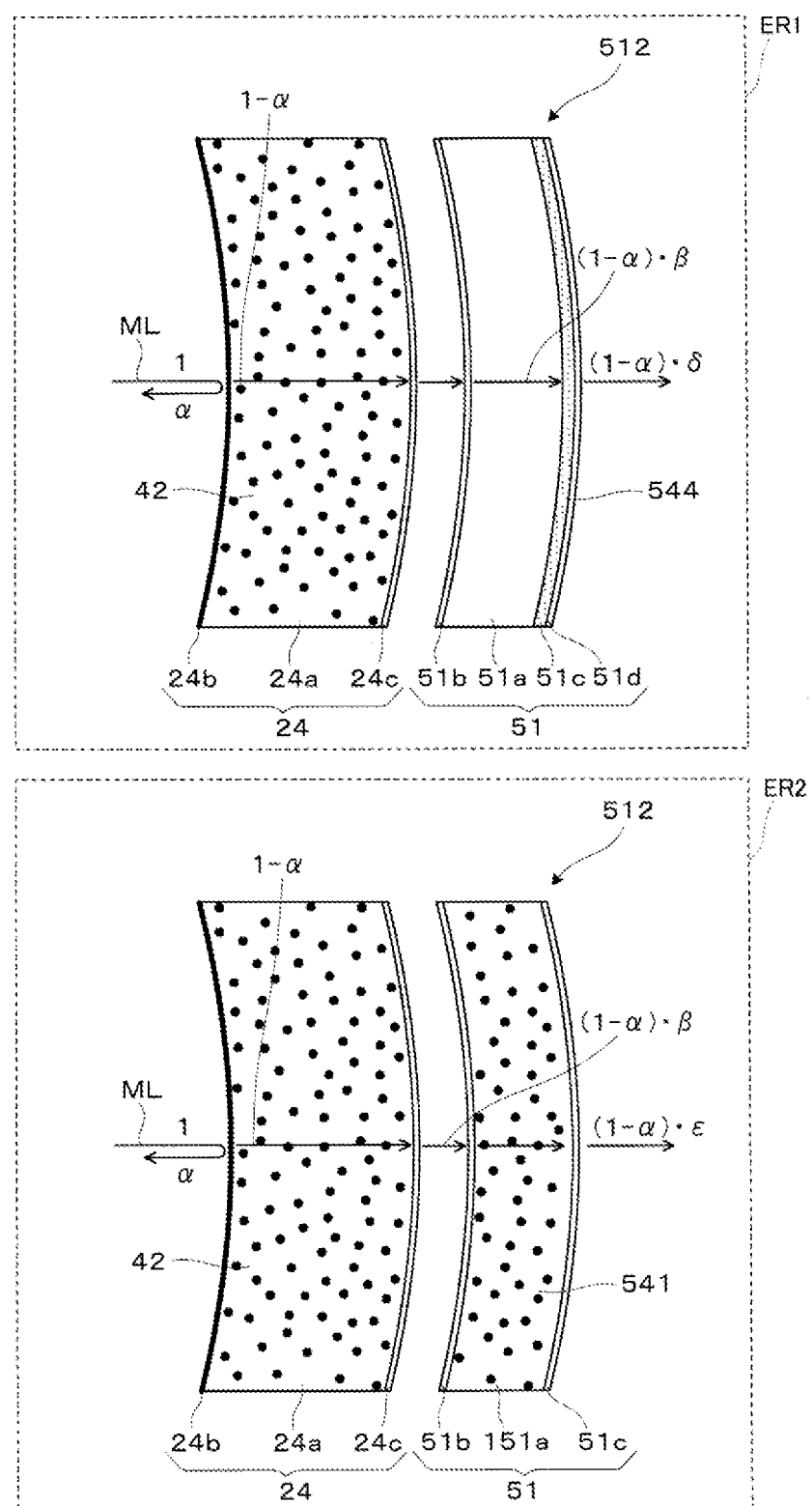
FIG. 10 is an enlarged sectional view illustrating a concave transmissive mirror of a fifth embodiment.
Figure 11:
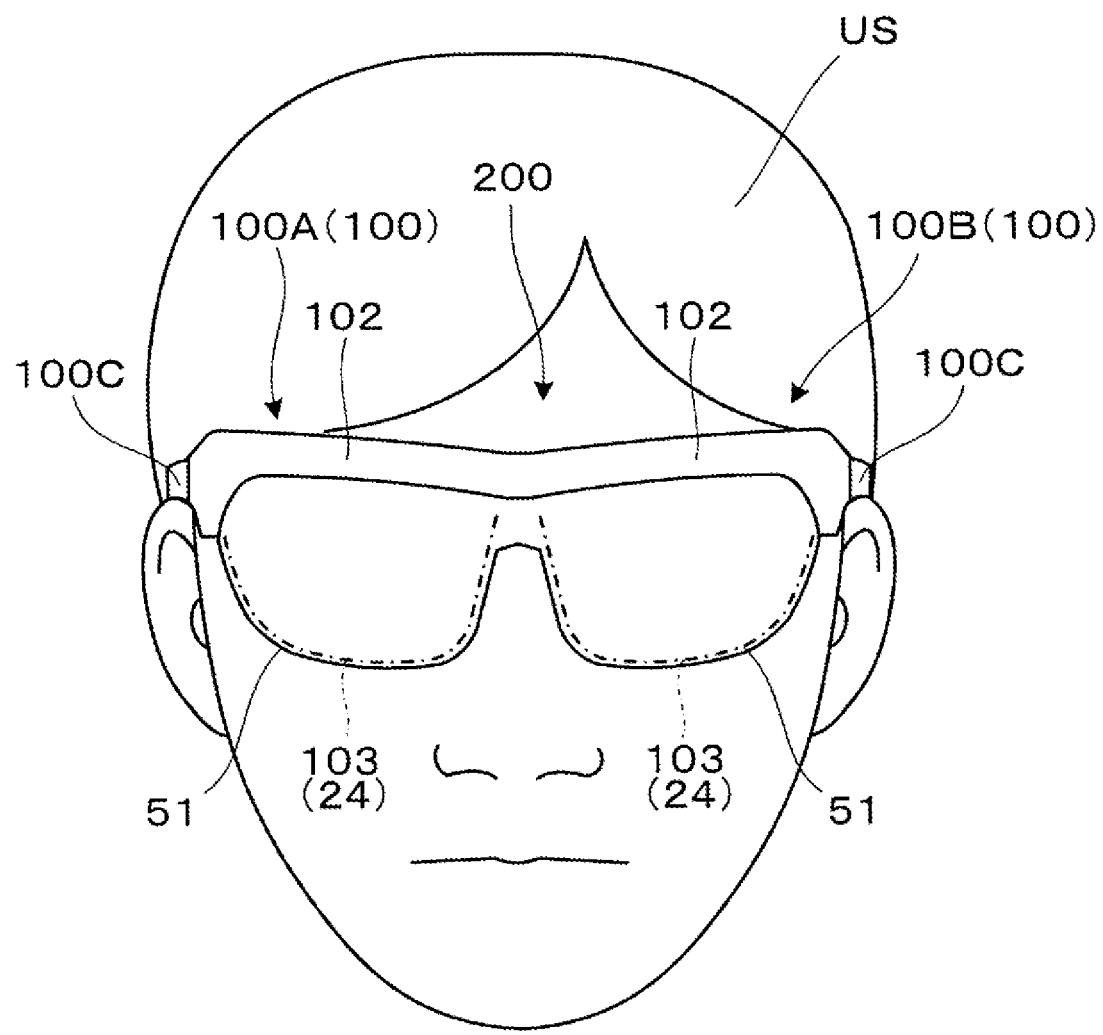
FIG. 11 is a front view for describing installation of a shade.

With reference to FIG. 10 and FIG. 11, an optical unit 512 incorporated in the virtual image display device of the fifth embodiment is described below.

In FIG. 10, a first region ER1 is an enlarged sectional view illustrating a region around the concave transmissive mirror 24 in the optical unit 512. A shade 51 is disposed on the external side of the concave transmissive mirror 24. The shade 51 is detachably fixed to the display driving part 102 illustrated in FIG. 1 and disposed in the state where it faces the concave transmissive mirror 24 with a space therebetween. The concave transmissive mirror 24 has the same structure as that described in the first embodiment. In the example illustrated in the drawing, the entirety of the transmissive member 24a is the emission light absorption member 42, but the concave transmissive mirror 24 may have the various structures illustrated in FIGS. 5 to 9. The shade 51 includes a transmissive member 51a that is a supporting body, an anti-reflective film 51b formed inside the transmissive member 51a, an emission light absorption film 51c formed on the external side of the transmissive member 51a, and an anti-reflective film 51d formed on the external side of the emission light absorption film 51c. The emission light absorption film 51c reduces the incident intensity of the external light on the concave transmissive mirror 24. In addition, the emission light absorption film 51c functions as an absorption film 544 that suppresses emission, to the external side, of the image light ML transmitted through the concave transmissive mirror 24. In the optical unit 512, assuming the reflectance of the transmissive reflective film 24b of the concave transmissive mirror 24 is α, the transmittance of the emission light absorption member 42 is β, and the transmittance of the emission light absorption film 51c of the shade 51 is δ, the image light ML is attenuated to $(1-\alpha)\cdot\beta$ from the original state by being passed through the concave transmissive mirror 24, and attenuated to $(1-\delta)\cdot\beta\cdot\delta$ from the original state by being passed through the shade 51. In the case where the reflectance α and the transmittances β and δ are ½, for example, the intensity of the image light ML emitted to the external side through the concave transmissive mirror 24 and the shade 51 is attenuated to ⅛.

In FIG. 10, a second region ER2 is an enlarged sectional view illustrating the optical unit 512 of a modification. The shade 51 includes a transmissive member 151a that is a supporting body, the anti-reflective film 51b formed inside the transmissive member 151a, and the anti-reflective film 51d formed on the external side of the transmissive member 151a. The transmissive member 151a is composed of a material in which an absorber is dispersed in a base material of a resin, and reduces the incident intensity of the external light on the concave transmissive mirror 24. In addition, the transmissive member 151a functions as the absorber layer 541 that suppresses emission, to the external side, of the image light ML passed through the concave transmissive mirror 24. Assuming, in the optical unit 512, the reflectance of the transmissive reflective film 24b of the concave transmissive mirror 24 is α, the transmittance of the emission light absorption member 42 is β, and the transmittance of the absorber layer 541 of the shade 51 is ε, the image light ML is attenuated to $(1-\alpha)\cdot\beta$ from the original state by being passed through the concave transmissive mirror 24, and attenuated to $(1-\alpha)\cdot\beta\cdot\epsilon$ from the original state by being passed through the shade 51. In the case where the reflectance α and the transmittances β and ε are ½, for example, the intensity of the image light ML emitted to the external side through the concave transmissive mirror 24 and the shade 51 is attenuated to ⅛.

As illustrated in FIG. 11, the shade 51 is detachably fixed to an eyeglass-frame shaped portion provided in the display driving part 102. The shade 51 covers the entirety the exterior member 103 including the concave transmissive mirror 24. As a result, the shade 51 is provided in a region that covers the transmissive member 24a or the emission light absorption member 42 as the absorber layer formed on the external side of the concave transmissive mirror 24. In the case where the emission light absorption film 45 serving as an absorption film illustrated in FIG. 7 is provided in the concave transmissive mirror 24, the shade 51 is provided in a region that covers the emission light absorption film 45. In this manner, by completely covering the emission light absorption member 42 and the emission light absorption film 45 with the shade 51, the image light ML is less seen from the outside. It is to be noted that in the case where the emission light absorption member 42 and/or the emission light absorption film 45 is not formed in the entire region of the concave transmissive mirror 24, the shade 51 may cover a narrow region that faces the emission light absorption member 42 and/or the emission light absorption film 45.

Sixth Embodiment

A virtual image display device of a sixth embodiment is described below. The virtual image display device and the like of the sixth embodiment are obtained by partially changing the virtual image display device of the first embodiment, and therefore the description for the common portions is omitted.

Figure 12:
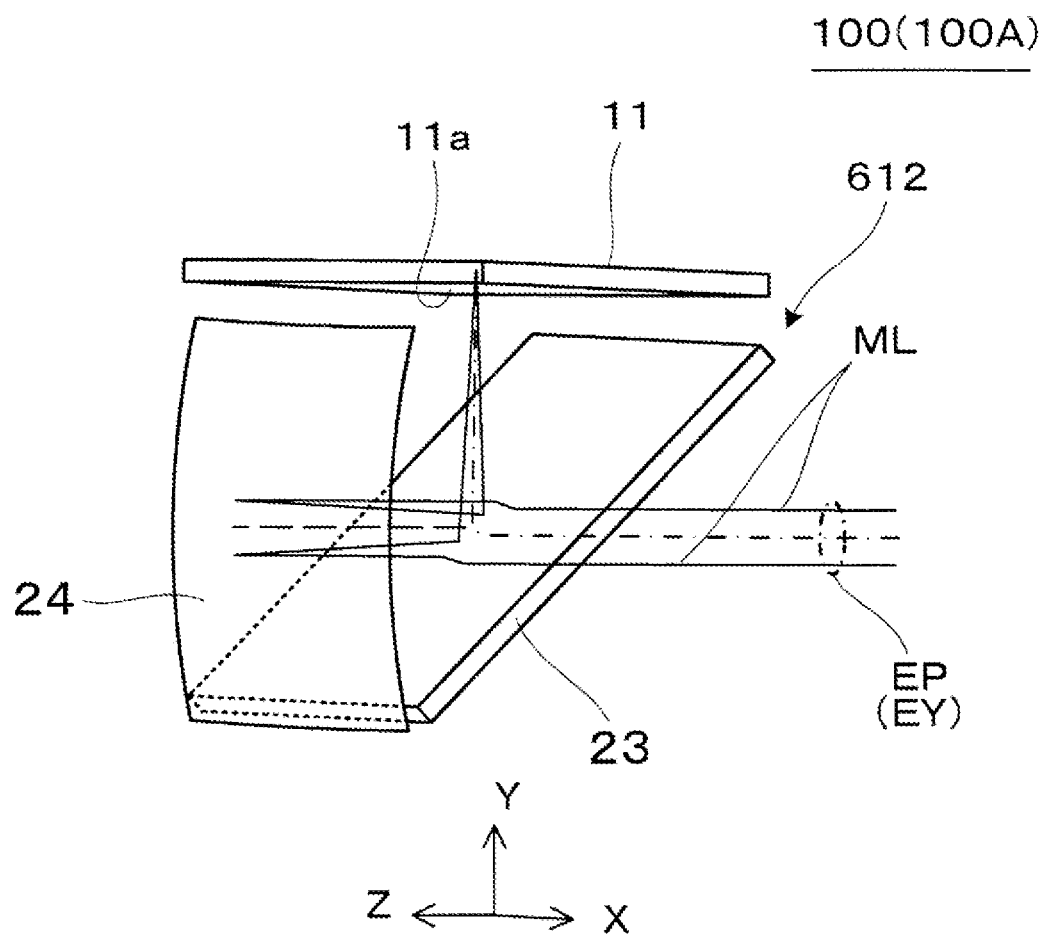
FIG. 12 is a schematic perspective view for describing a structure of a virtual image display device of a sixth embodiment.
Figure 13:
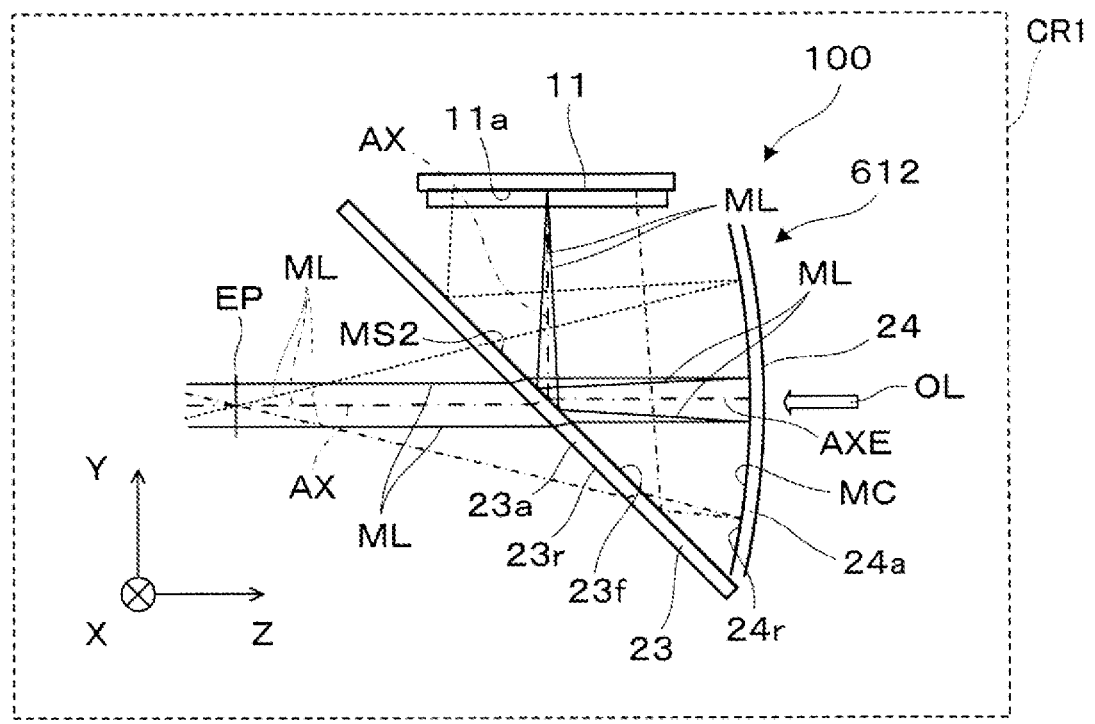
FIG. 13 is a side sectional view and a partial sectional plan view of the virtual image display device of FIG. 12.
Figure 13:
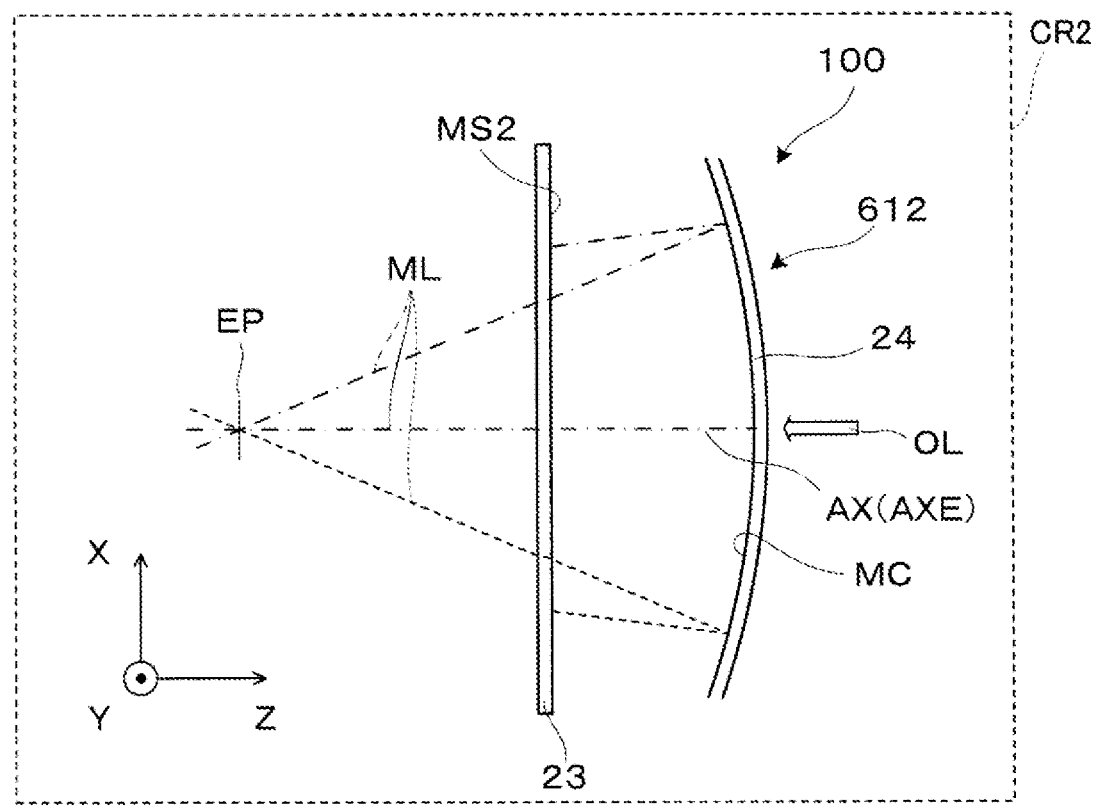

With reference to FIG. 12 and FIG. 13, the virtual image display device of the sixth embodiment is described below. FIG. 12 is a schematic perspective view for describing a structure of the virtual image display device 100. In FIG. 13, a first region FR1 is a side view of the image light generation device 11 and an optical unit 612, and a second region FR2 is a plan view illustrating a partial cross section along light paths of the image light generation device 11 and the optical unit 612.

The optical unit 612 includes the transmissive tilted mirror 23 and the concave transmissive mirror 24. Specifically, in the virtual image display device of the sixth embodiment, the image light ML is caused to impinge on the concave transmissive mirror 24 without forming an intermediate image.

Regarding the light paths, the image light ML from the image light generation device 11 impinges on the transmissive tilted mirror 23. The image light ML that is reflected by, for example, approximately 50% at the transmissive tilted mirror 23 impinges on the concave transmissive mirror 24 so as to be reflected at the transmissive reflective surface MC at a reflectance of approximately 50% or less, for example. The image light ML reflected by the concave transmissive mirror 24 impinges on the exit pupil EP where the eye EY or the pupil hole of the wearer US is located. External light OL transmitted through the concave transmissive mirror 24 also impinges on the exit pupil EP. That is, the wearer US wearing the HMD 200 can observe a virtual image of the image light ML superimposed on external images.

In the optical unit 612, the cross-sectional structure of the concave transmissive mirror 24 is the same as that illustrated in FIGS. 4 to 9. In addition, the shade 51 illustrated in FIG. 10 may be detachably disposed on the external side of the concave transmissive mirror 24.

Seventh Embodiment

A virtual image display device of a seventh embodiment is described below. The virtual image display device and the like of the seventh embodiment are obtained by partially changing the virtual image display device of the first embodiment, and therefore the description for the common portions is omitted.

Figure 14:
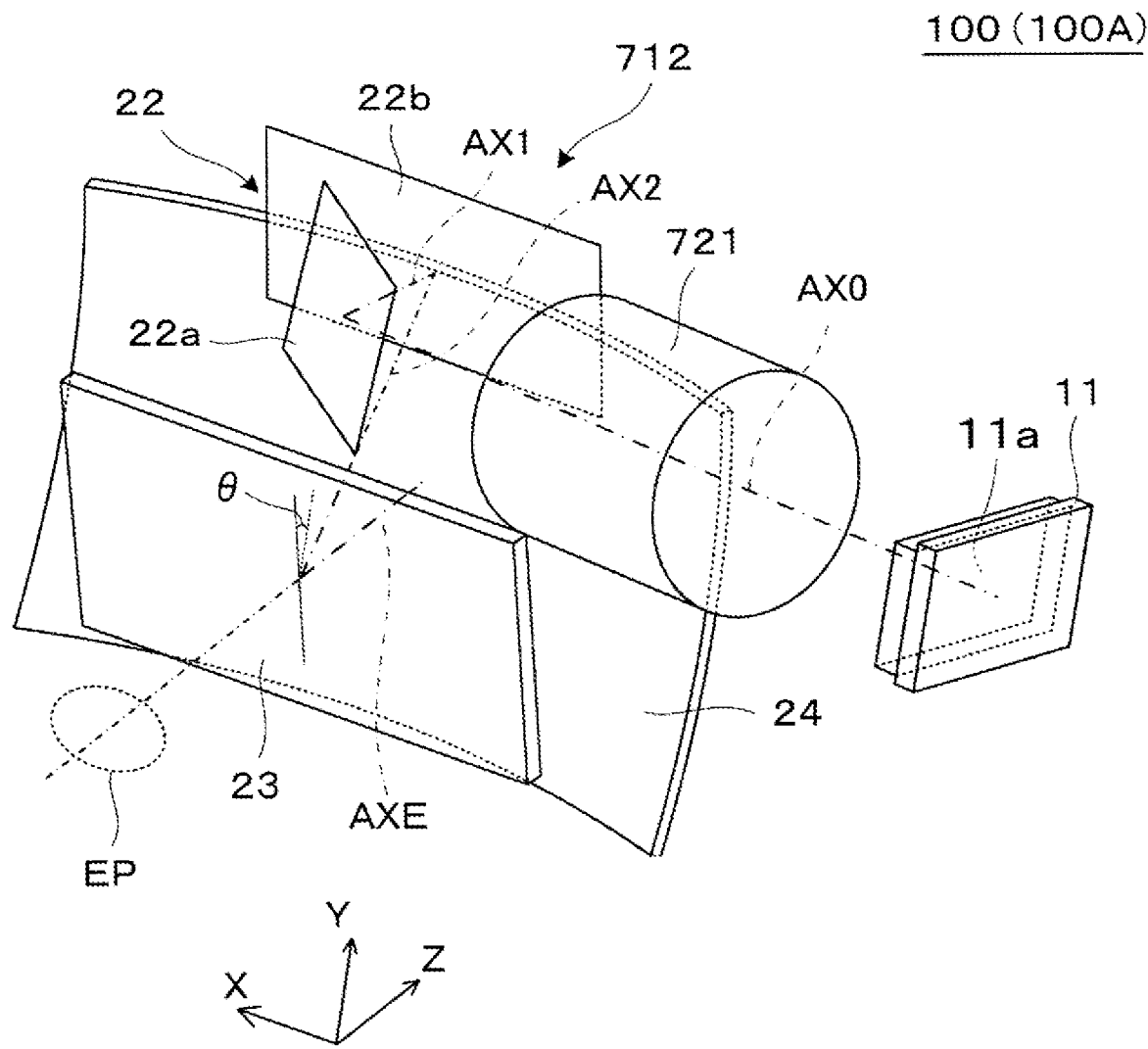
FIG. 14 is a schematic perspective view for describing a structure of a virtual image display device of a seventh embodiment.

With reference to FIG. 14, the virtual image display device of the seventh embodiment is described below. An optical unit 712 includes a projection optical system 721, a turning mirror 22, the transmissive tilted mirror 23, and the concave transmissive mirror 24. Specifically, the turning mirror 22 is disposed between the projection optical system 721 and the transmissive tilted mirror 23.

The turning mirror 22 includes a first mirror 22a and a second mirror 22b in the order of the light path from the image light generation device 11. The turning mirror 22 reflects the image light ML from the projection optical system 721 in the intersection direction. On the light emission side of the second mirror 22b, the transmissive tilted mirror 23 is disposed. A projection optical axis AX0, which is the optical axis of the projection optical system 721, extends in parallel to the X-axis direction of the lateral direction. The light path is bent by the first mirror 22a along the reflection optical axis AX1 from the projection optical axis AX0, and the light path is bent by the second mirror 22b along the reflection optical axis AX2 from the reflection optical axis AX1. As a result, the optical axis extended in a substantially horizontal direction on the emission side of the projection optical system 721 extends in a substantially vertical direction on the incident side of the transmissive tilted mirror 23.

With respect to the XY plane extending in the vertical direction as a reference, the transmissive tilted mirror 23 is tilted at an angle θ=approximately 20 to 40° in the counterclockwise direction around the X axis as viewed from the −X side. The light path from the image light generation device 11 to the turning mirror 22 is disposed on the upper side of the transmissive tilted mirror 23. To be more specific, the image light generation device 11, the projection optical system 21, and the turning mirror 22 are disposed in a space sandwiched between a tilted plane extended from the transmissive tilted mirror 23 and a vertical plane extended upward from the upper end of the concave transmissive mirror 24.

In the optical unit 712, the cross-sectional structure of the concave transmissive mirror 24 is the same as that illustrated in FIGS. 4 to 9. In addition, the shade 51 illustrated in FIG. 10 and FIG. 11 may be detachably disposed on the external side of the concave transmissive mirror 24.

Eighth Embodiment

A virtual image display device of an eighth embodiment is described below. The virtual image display device and the like of the eighth embodiment are obtained by partially changing the virtual image display device of the first embodiment, and therefore the description for the common portions is omitted.

Figure 15:
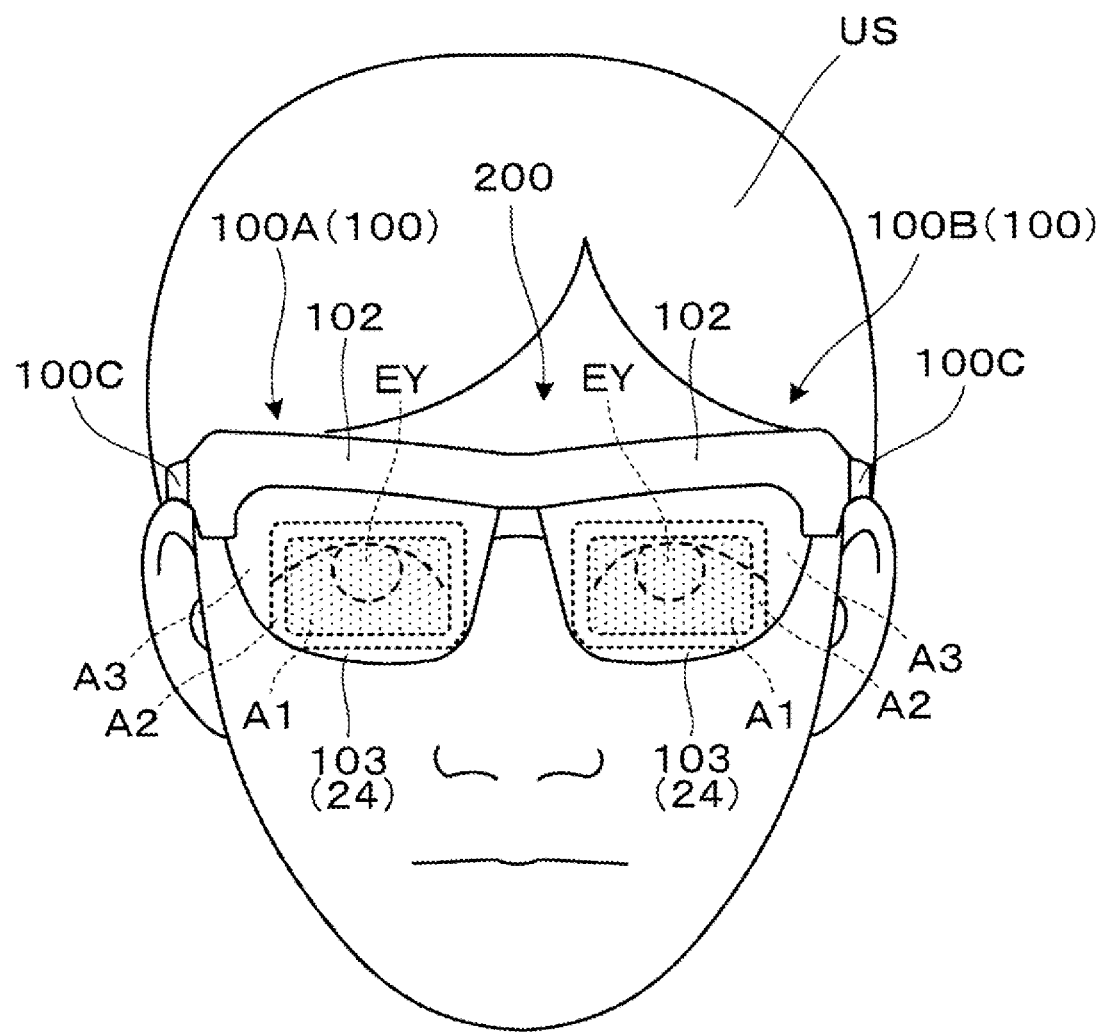
FIG. 15 is a front view for describing a virtual image display device of an eighth embodiment.

With reference to FIG. 15, the virtual image display device of the eighth embodiment is described below. In the present embodiment, in the concave transmissive mirror 24, the transmissive reflective surface MC is formed in a region A1 that faces the transmissive tilted mirror 23, and the absorber layer 41 and the absorption film 44 are formed on the external side thereof. In regions A2 and A3 around the region A1, a reflectance transition region whose reflectance is gradually reduced with respect to the transmissive reflective surface MC may be formed, or an absorptivity transition region whose absorptivity is gradually reduced with respect to the absorber layer 41 and/or the absorption film 44 may be formed.

Modification and So Forth

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

While the virtual image display device 100 of the above-mentioned embodiments uses self-luminous display devices such as organic EL elements and other light modulation elements such as LCDs as the image light generation device 11, it is also possible to adopt a configuration using a laser scanner including a combination of a laser light source and a scanner such as a polygon mirror, in place of the above-mentioned configuration. Specifically, the present disclosure is applicable to a head-mounted display of a laser retinal projection type.

The transmissive member 24a that constitutes the concave transmissive mirror 24 is not limited to a resin material, and may be formed of glass and/or synthetic quartz.

The optical unit 12 may be an optical system including a light guide, a prism, a complex of a prism and a mirror, and the like in the preceding stage of the transmissive tilted mirror 23.

In a specific aspect, a virtual image display device includes an image light generation device, a transmissive tilted mirror configured to reflect image light from the image light generation device, and a concave transmissive mirror configured to reflect, toward the transmissive tilted mirror, the image light reflected by the transmissive tilted mirror to form an exit pupil. The virtual image display device further includes an absorber layer or an absorption film on an external side of a transmissive reflective surface formed in the concave transmissive mirror.

Since the above-mentioned virtual image display device includes the absorber layer or the absorption film on the external side of the transmissive reflective surface formed in the concave transmissive mirror, the image light passed through the transmissive reflective surface and emitted to the external side is reduced by the absorber layer or the absorption film, and the image being displayed is less seen from the outside, thus increasing the effect of suppressing information leakage. It is to be noted that through the use of the transmissive tilted mirror, the weight of the optical system of the virtual image display device can be reduced in comparison with a case where a prism member is used.

In a specific aspect, the absorber layer is an emission light absorption member formed on the external side of the transmissive reflective surface. With this emission light absorption member, the image light transmitted through the transmissive reflective surface is reduced.

In another specific aspect, the virtual image display device, the emission light absorption member is formed on a side opposite to the transmissive reflective surface through a supporting body configured to support the transmissive reflective surface. In this case, the transmissive reflective surface is formed on one side of the supporting body, and the emission light absorption member is disposed on the other side of the supporting body.

In still another specific aspect, the virtual image display device further includes an outer reflective surface of a transmissive type on a side opposite to the transmissive reflective surface through a supporting body configured to support the transmissive reflective surface. The emission light absorption member is provided between the transmissive reflective surface and the outer reflective surface. In this case, the image light emitted to the outside of the virtual image display device can be reduced also by an outer transmissive mirror, and the effect of preventing information leakage can be further increased.

In still another specific aspect, the absorption film is an emission light absorption film formed on the external side of the transmissive reflective surface and spaced apart from the transmissive reflective surface. With this emission light absorption film, the image light transmitted through the concave transmissive mirror is reduced.

In still another specific aspect, the concave transmissive mirror includes an emission light absorption member as the absorber layer on the external side of the transmissive reflective surface, and an emission light absorption film as the light absorption film on the external side of the emission light absorption member. In this case, with the emission light absorption member and the emission light absorption film, the image light emitted to the outside of the virtual image display device can be reduced, and the effect of preventing information leakage can be further increased.

In still another specific aspect, the concave transmissive mirror reflects the image light toward the transmissive tilted mirror to form an exit pupil.

In still another specific aspect, the virtual image display device further includes a shade spaced apart from the concave transmissive mirror on the external side of the concave transmissive mirror. In this case, with the shade, the image light emitted to the outside of the virtual image display device can be reduced, and the effect of preventing information leakage can be further increased.

In still another specific aspect, the shade includes an absorber layer or an absorption film. The shade may shield the light using a mirror having a transmissivity, but may shield the light using the above-mentioned the absorber layer or the absorption film.

In still another specific aspect, the shade is provided in a region formed on the external side of the concave transmissive mirror, the region covering the absorber layer or the absorption film.

In still another specific aspect, the concave transmissive mirror has a thickness of 2 mm or smaller. In this case, the weight of the mirror member can be reduced, and thus the weight of the optical system of the virtual image display device can be reduced.

In still another specific aspect, an emission light axis from the transmissive tilted mirror toward the concave transmissive mirror is set to a forward and downward direction with respect to a horizontal axis.

In still another specific aspect, an anti-reflective film is formed at a surface of the concave transmissive mirror on the external side.

In still another specific aspect, the virtual image display device further includes a turning mirror configured to reflect, in an intersection direction, the image light from the image light generation device. In this case, it is possible to easily prevent the image light generation device and associated optical elements from largely protruding upward and rearward of the transmissive tilted mirror, and the virtual image display device can be downsized, thus achieving a slender exterior appearance.

In still another specific aspect, the virtual image display device further includes a projection optical system disposed between the image light generation device and the transmissive tilted mirror and configured to form an intermediate image. In this case, the image quality can be increased while downsizing the image light generation device with the projection optical system.

In still another specific aspect, the image light is incident on the concave transmissive mirror without forming an intermediate image.

In a specific aspect, an optical unit includes a transmissive tilted mirror configured to reflect image light, and a concave transmissive mirror configured to reflect, toward the transmissive tilted mirror, the image light reflected by the transmissive tilted mirror. The optical unit further includes an absorber layer or an absorption film on an external side of a transmissive reflective surface formed in the concave transmissive mirror.

Since the above-mentioned optical unit includes the absorber layer or the absorption film on the external side of the transmissive reflective surface formed in the concave transmissive mirror, the image light transmitted through the transmissive reflective surface and emitted to the external side is reduced by the absorber layer or the absorption film, the image being displayed is less seen from the outside, and the effect of suppressing information leakage is increased. It is to be noted that through the use of the transmissive tilted mirror, the weight of the optical system of the virtual image display device can be reduced in comparison with a case where a prism member is used.

What is claimed is:

1. A virtual image display device comprising:
an image light generation device generating image light;
a first mirror reflecting the image light from the image light generation device; and
a second mirror having a concave shape and reflecting, toward the first mirror, the image light reflected by the first mirror;
wherein the second mirror includes a transmissive member, a first reflection member, an absorption member,
the transmissive member includes a first surface and a second surface opposing to the first surface,
the first reflection member on which the image light reflected by the first mirror is incident, the first reflection member is provided along the first surface of the transmissive member, the first reflection surface reflects a part of the image light and transmits other part of the image light,
the absorption member absorbs other part of the image light, the absorption member is provided along the second surface of the transmissive member.

2. The virtual image display device according to claim 1, wherein the absorption member absorbs the image through the first reflection surface.

3. The virtual image display device according to claim 2, wherein the second mirror includes a second reflection member reflecting a part of the image light and transmitting other part of the image,
the absorption member is provided between the transmissive member and the second reflection member.

4. The virtual image display device according to claim 1, wherein the absorption member is spaced apart from the first reflection member.

5. The virtual image display device according to claim 1, wherein the absorption includes a first absorber layer and a first absorption film,
the first absorber layer absorbs the image light through the first reflection surface,
the first absorption film absorbs the image light through the first absorber layer.

6. The virtual image display device according to claim 1, wherein the second mirror reflects the image light toward the first mirror to form an exit pupil.

7. The virtual image display device according to claim 1, comprising a shade spaced apart from the second mirror,
the second mirror is disposed between the first mirror and the shade.

8. The virtual image display device according to claim 7, wherein the shade includes a second absorber layer or a second absorption film.

9. The virtual image display device according to claim 8, wherein the shade covers the absorption member.

10. The virtual image display device according to claim 1, wherein the second mirror has a thickness of 2 mm or smaller.

11. The virtual image display device according to claim 1, wherein an emission light axis extends from the first mirror toward the second mirror is inclined to downward direction with respect to a horizontal axis.

12. The virtual image display device according to claim 1, wherein the second mirror includes an anti-reflective film,
the absorption member is provided between the transmissive member and the anti-reflective film.

13. The virtual image display device according to claim 1, further comprising a third mirror reflecting, to an intersection direction, the image light from the image light generation device.

14. The virtual image display device according to claim 1, further comprising a projection optical system disposed between the image light generation device and the first mirror and forming an intermediate image.

15. The virtual image display device according to claim 1, wherein the image light is entered to the second mirror without forming an intermediate image.

16. An optical unit comprising:
a first mirror reflecting image light; and
a second mirror having a concave shape and reflecting, toward the first mirror, the image light reflected by the first mirror;
wherein
the second mirror includes a transmissive member, a first reflection member, an absorption member,
the transmissive member includes a first surface and a second surface opposing to the first surface,
the first reflection member on which the image light reflected by the first mirror is incident, the first reflection member is provided along the first surface of the transmissive member, the first reflection member reflects a part of the image light and transmits other part of the image light,
the absorption member absorbs other part of the image light, the absorption member is provided along the second surface of the transmissive member.

* * * * *